US012561755B2

(12) United States Patent
Fu et al.

(10) Patent No.: US 12,561,755 B2
(45) Date of Patent: Feb. 24, 2026

(54) SYSTEM AND METHOD FOR IMAGE SUPER-RESOLUTION

(71) Applicant: Northeastern University, Boston, MA (US)

(72) Inventors: Yun Fu, Newton, MA (US); Bin Sun, Everett, MA (US)

(73) Assignee: Northeastern University, Boston, MA (US)

( * ) Notice: Subject to any disclaimer, the term of this patent is extended or adjusted under 35 U.S.C. 154(b) by 507 days.

(21) Appl. No.: 18/055,386

(22) Filed: Nov. 14, 2022

(65) Prior Publication Data

US 2023/0153946 A1     May 18, 2023

Related U.S. Application Data

(60) Provisional application No. 63/264,058, filed on Nov. 15, 2021.

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01)

(58) Field of Classification Search
CPC ..................... G06T 3/40; G06T 3/4046; G06T 3/4053–4076; G06T 2207/20081; G06T 2207/20084; G06V 10/454; G06V 10/82; G06N 3/02–0985
See application file for complete search history.

(56) References Cited

U.S. PATENT DOCUMENTS

2023/0092017 A1*  3/2023  Seo ........................... G06F 7/76
                                            708/200
2024/0137517 A1*  4/2024  Lin ....................... G06T 3/4046

OTHER PUBLICATIONS

Chatterjee, Soumick, et al. "ShuffleUNet: Super resolution of diffusion-weighted MRIs using deep learning." arXiv preprint arXiv:2102.12898v1 (2021). (Year: 2021).*
Sun, Bin, et al. "Hybrid Pixel-Unshuffled Network for Lightweight Image Super-Resolution." arXiv preprint arXiv:2203.08921v1 (2022). (Year: 2022).*

(Continued)

*Primary Examiner* — Geoffrey E Summers
(74) *Attorney, Agent, or Firm* — Hamilton, Brook, Smith & Reynolds, P.C.

(57)                    ABSTRACT

A system and corresponding method perform image super-resolution (SR). The system comprises an element-un-shuffled downsampler and an image SR module. The image SR module performs image SR on a low-resolution (LR) representation of a high-resolution (HR) original image. The HR original image is at a higher resolution relative to a resolution of the LR representation. The image SR module produces a reconstructed version of the HR original image via the image SR performed. The image SR is based on element-unshuffled downsampling of the LR representation. The element-unshuffled downsampler performs the element-unshuffled downsampling. The image SR module outputs the reconstructed version produced. The system performs the image SR with fewer parameters and less computation cost relative to conventional image SR.

16 Claims, 16 Drawing Sheets
(11 of 16 Drawing Sheet(s) Filed in Color)

ELEMENT-UNSHUFFLED
DOWNSAMPLING (EUD)

(56)         References Cited

OTHER PUBLICATIONS

Lu, Zhengyang, and Ying Chen. "Dense U-net for super-resolution with shuffle pooling layer." arXiv preprint arXiv:2011.05490v2 (2020). (Year: 2021).*

Vignesh, Shiv. "The world through the eyes of CNN." Analytics Vidhya, Jun. 26, 2020. <https://medium.com/analytics-vidhya/the-world-through-the-eyes-of-cnn-5a52c034dbeb>. Retrieved Apr. 22, 2025. (Year: 2020).*

Wang, Lingdong, Mohammad Hajiesmaili, and Ramesh K. Sitaraman. "Focas: Practical video super resolution using foveated rendering." Proceedings of the 29th ACM International Conference on Multimedia. 2021. (Year: 2021).*

Sun, et al., "Hybrid Pixel-Unshuffled Network for Lightweight Image Super-Resolution," Northeastern University, Boston, MA, USA, Mar. 16, 2022.

Lim, et al., "Enhanced Deep Residual Networks for Single Image Super-Resolution," Department of ECE, ASRI, Seoul National University, 08826, Seoul, Korea, Jul. 10, 2017.

Howard, et al., "MobileNets: Efficient Convolutional Neural Networks for Mobile Vision Applications," Google Inc., Apr. 17, 2017.

Shi, et al., "Real-Time Single Image and Video Super-Resolution Using an Efficient Sub-Pixel Convolutional Neural Network," Twitter, Sep. 23, 2016.

Li, et al., "Feedback Network for Image Super-Resolution," Sichuan University, Jun. 28, 2019.

Qin, et al., "Remote Sensing Single-Image Resolution Improvement Using A Deep Gradient-Aware Network with Image-Specific Enhancement," Remote Sensing, MDPI, Feb. 26, 2020.

* cited by examiner

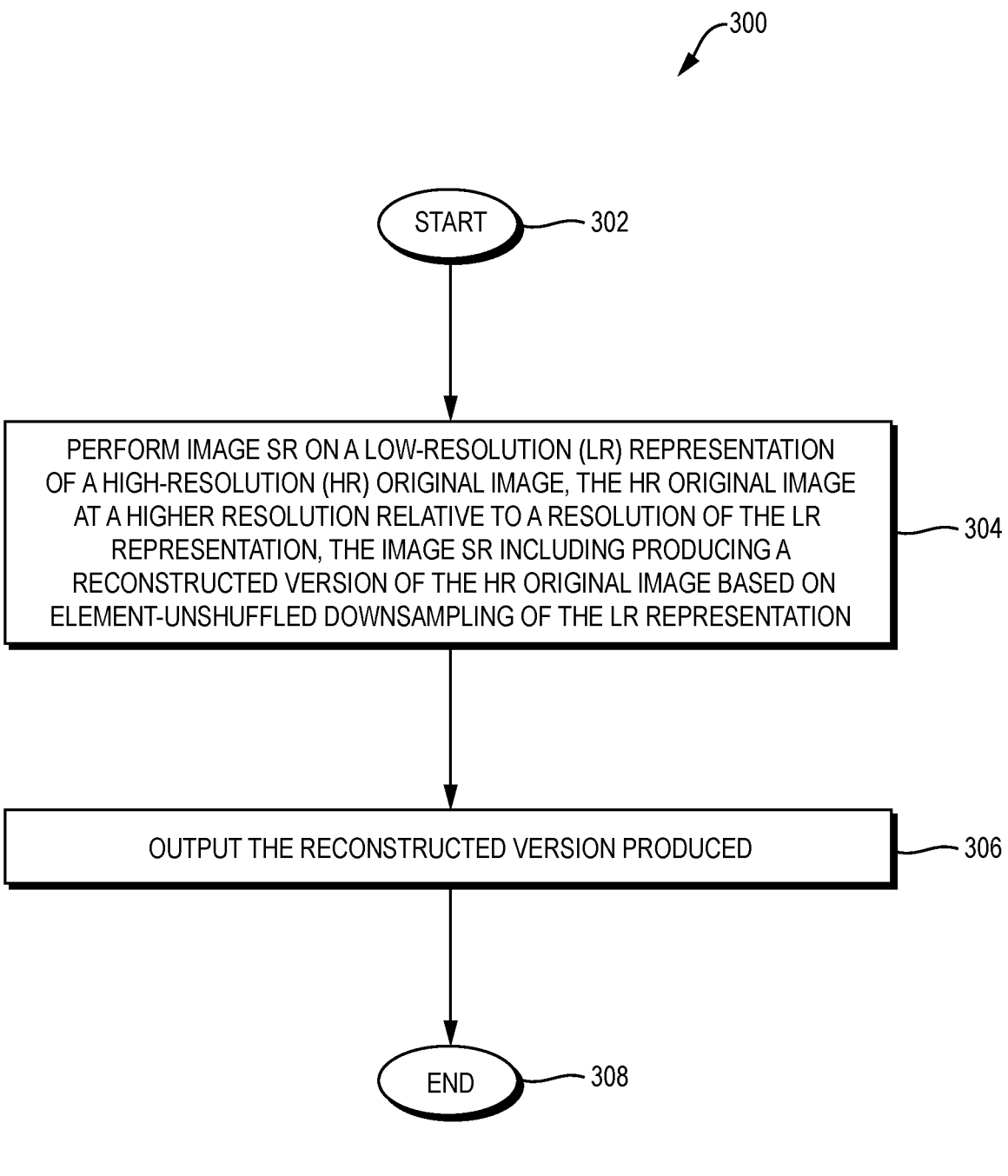

300

START — 302

PERFORM IMAGE SR ON A LOW-RESOLUTION (LR) REPRESENTATION OF A HIGH-RESOLUTION (HR) ORIGINAL IMAGE, THE HR ORIGINAL IMAGE AT A HIGHER RESOLUTION RELATIVE TO A RESOLUTION OF THE LR REPRESENTATION, THE IMAGE SR INCLUDING PRODUCING A RECONSTRUCTED VERSION OF THE HR ORIGINAL IMAGE BASED ON ELEMENT-UNSHUFFLED DOWNSAMPLING OF THE LR REPRESENTATION — 304

OUTPUT THE RECONSTRUCTED VERSION PRODUCED — 306

END — 308

FIG. 3

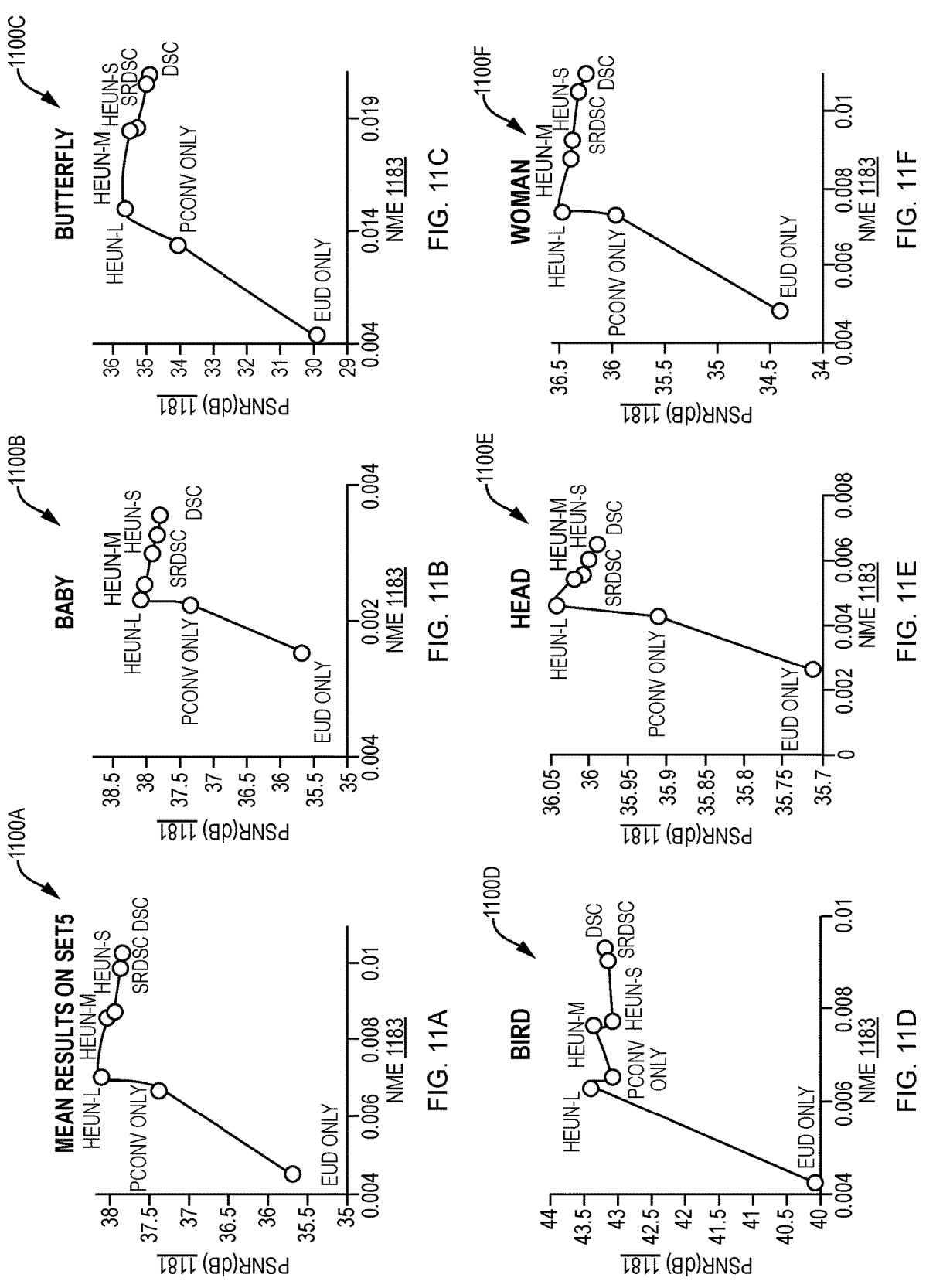

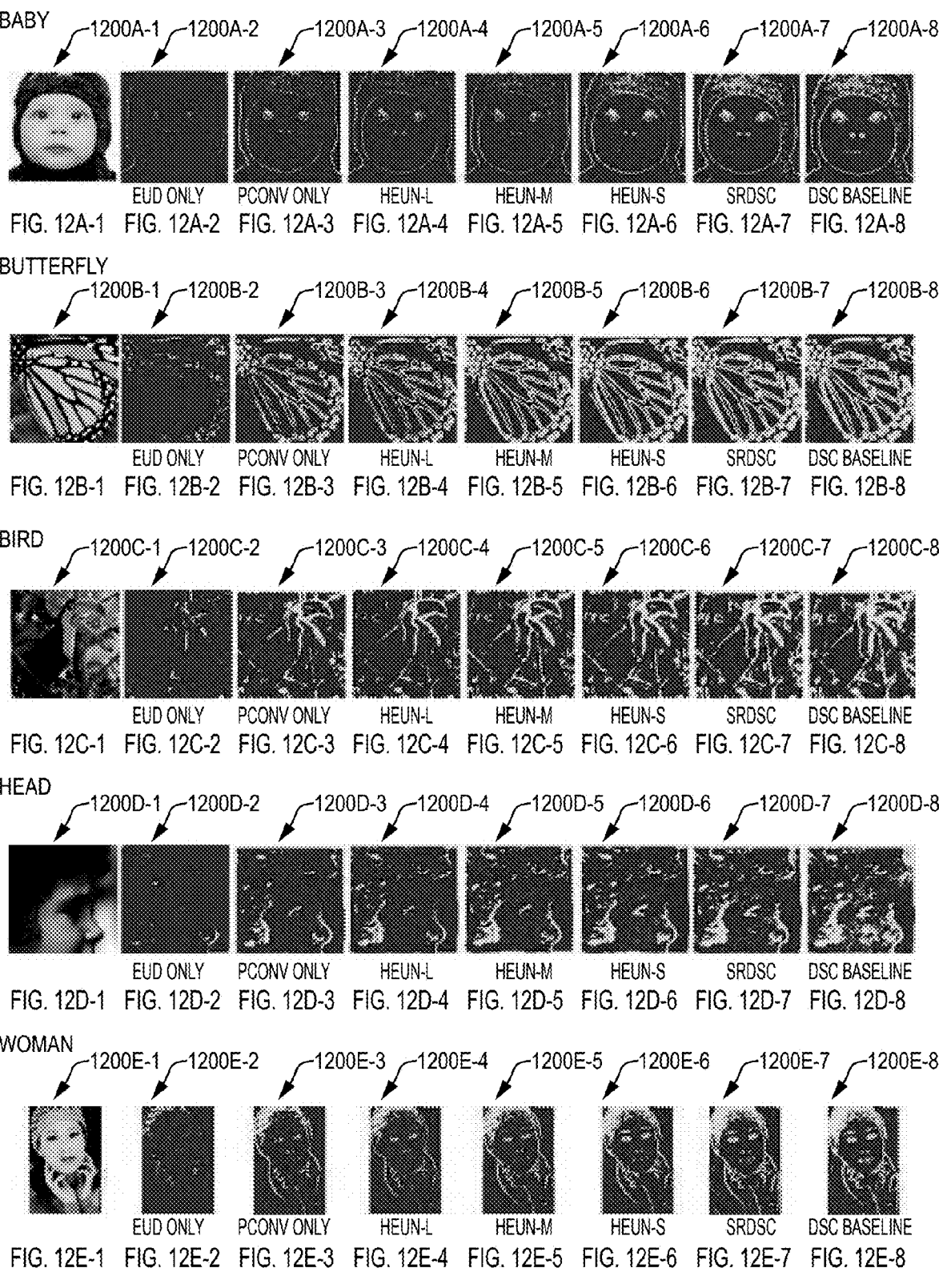

BABY 1200A-1  1200A-2  1200A-3  1200A-4  1200A-5  1200A-6  1200A-7  1200A-8

EUD ONLY   PCONV ONLY   HEUN-L   HEUN-M   HEUN-S   SRDSC   DSC BASELINE

FIG. 12A-1  FIG. 12A-2  FIG. 12A-3  FIG. 12A-4  FIG. 12A-5  FIG. 12A-6  FIG. 12A-7  FIG. 12A-8

BUTTERFLY 1200B-1  1200B-2  1200B-3  1200B-4  1200B-5  1200B-6  1200B-7  1200B-8

EUD ONLY   PCONV ONLY   HEUN-L   HEUN-M   HEUN-S   SRDSC   DSC BASELINE

FIG. 12B-1  FIG. 12B-2  FIG. 12B-3  FIG. 12B-4  FIG. 12B-5  FIG. 12B-6  FIG. 12B-7  FIG. 12B-8

BIRD 1200C-1  1200C-2  1200C-3  1200C-4  1200C-5  1200C-6  1200C-7  1200C-8

EUD ONLY   PCONV ONLY   HEUN-L   HEUN-M   HEUN-S   SRDSC   DSC BASELINE

FIG. 12C-1  FIG. 12C-2  FIG. 12C-3  FIG. 12C-4  FIG. 12C-5  FIG. 12C-6  FIG. 12C-7  FIG. 12C-8

HEAD 1200D-1  1200D-2  1200D-3  1200D-4  1200D-5  1200D-6  1200D-7  1200D-8

EUD ONLY   PCONV ONLY   HEUN-L   HEUN-M   HEUN-S   SRDSC   DSC BASELINE

FIG. 12D-1  FIG. 12D-2  FIG. 12D-3  FIG. 12D-4  FIG. 12D-5  FIG. 12D-6  FIG. 12D-7  FIG. 12D-8

WOMAN 1200E-1  1200E-2  1200E-3  1200E-4  1200E-5  1200E-6  1200E-7  1200E-8

EUD ONLY   PCONV ONLY   HEUN-L   HEUN-M   HEUN-S   SRDSC   DSC BASELINE

FIG. 12E-1  FIG. 12E-2  FIG. 12E-3  FIG. 12E-4  FIG. 12E-5  FIG. 12E-6  FIG. 12E-7  FIG. 12E-8

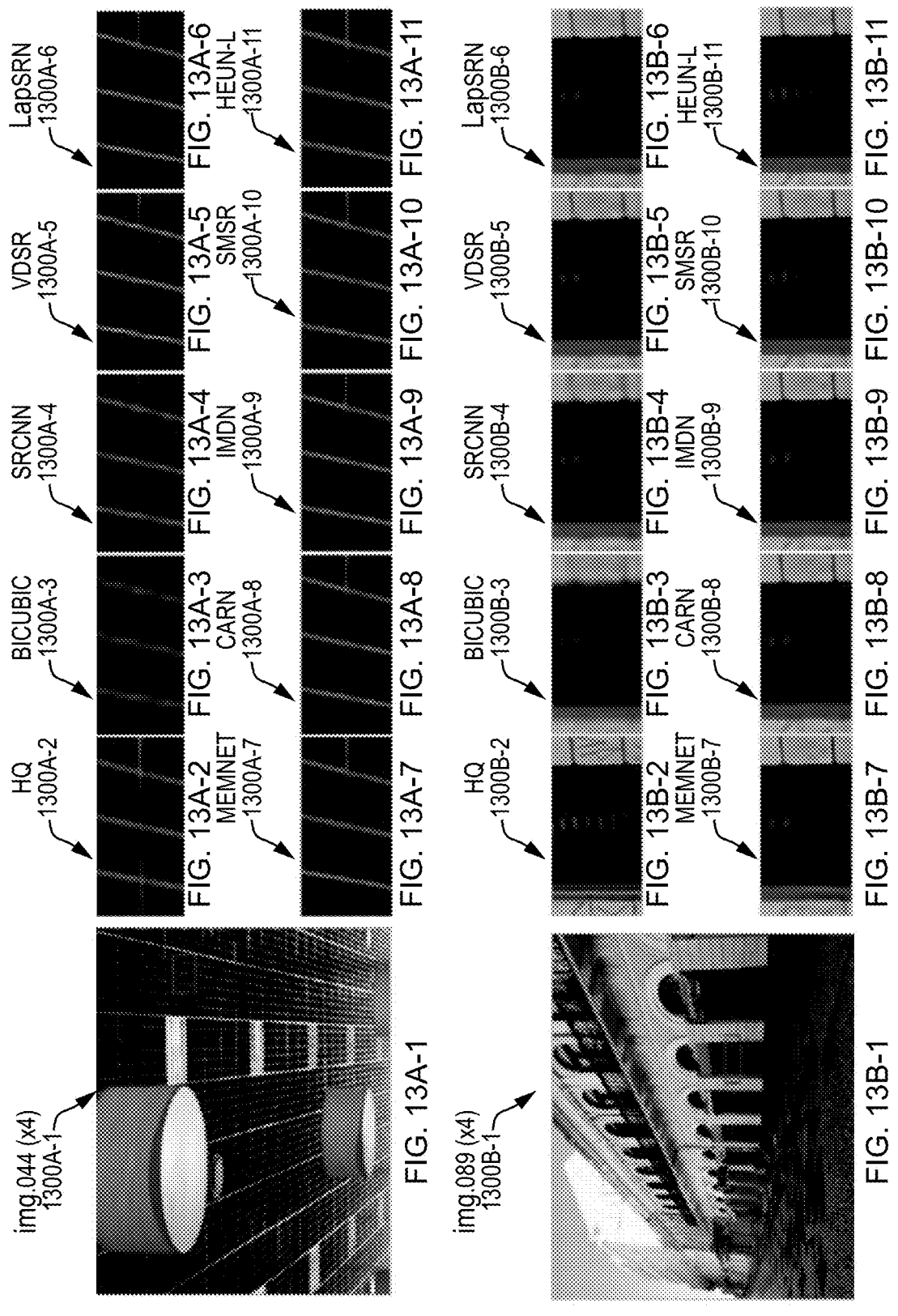

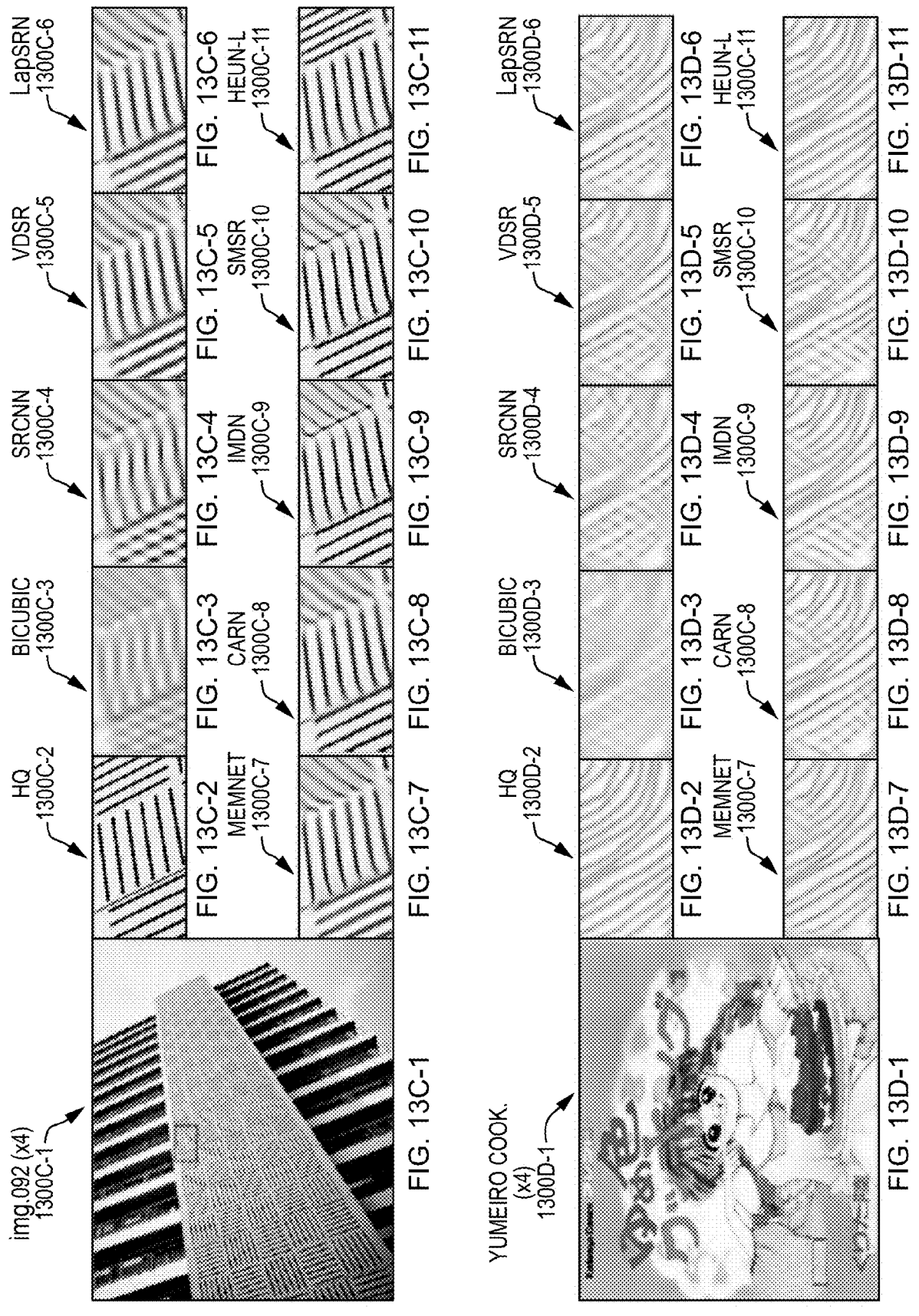

×2 Scaling Factor

| Method Name | Scale | Params | Multi-Adds | Set5 | | Set14 | | B100 | | Urban100 | | Manga109 | |
|---|---|---|---|---|---|---|---|---|---|---|---|---|---|
| | | | | PSNR | SSIM | PSNR | SSIM | PSNR | SSIM | PSNR | SSIM | PSNR | SSIM |
| Bicubic | ×2 | - | - | 33.66 | 0.9299 | 30.24 | 0.8488 | 29.56 | 0.8431 | 26.88 | 0.8403 | 30.80 | 0.9339 |
| SRCNN | ×2 | 57K | 52.7G | 36.66 | 0.9542 | 32.45 | 0.9067 | 31.36 | 0.8879 | 29.50 | 0.8946 | 35.60 | 0.9663 |
| VDSR | ×2 | 665K | 612.6G | 37.53 | 0.9590 | 33.05 | 0.9130 | 31.90 | 0.8960 | 30.77 | 0.9140 | 37.22 | 0.9750 |
| DRCN | ×2 | 1774K | 9788.7G | 37.63 | 0.9588 | 33.04 | 0.9118 | 31.85 | 0.8942 | 30.75 | 0.9133 | 37.55 | 0.9732 |
| DRRN | ×2 | 297K | 6797.0G | 37.74 | 0.9591 | 33.23 | 0.9136 | 32.05 | 0.8973 | 31.23 | 0.9188 | 37.92 | 0.9760 |
| LapSRN | ×2 | 813K | 29.9G | 37.52 | 0.9591 | 33.08 | 0.9130 | 31.08 | 0.8950 | 30.41 | 0.9101 | 37.27 | 0.9740 |
| MemNet | ×2 | 677K | 623.9G | 37.78 | 0.9597 | 33.28 | 0.9142 | 32.08 | 0.8978 | 31.31 | 0.9195 | 37.72 | 0.9740 |
| CARN | ×2 | 1592K | 222.8G | 37.76 | 0.9590 | 33.52 | 0.9166 | 32.09 | 0.8978 | 31.92 | 0.9256 | 38.36 | 0.9765 |
| IDN | ×2 | 553K | 127.7G | 37.83 | 0.9600 | 33.30 | 0.9148 | 32.08 | 0.8985 | 31.27 | 0.9196 | 38.01 | 0.9749 |
| SRFBN-S | ×2 | 282K | 574.4G | 37.78 | 0.9597 | 33.35 | 0.9156 | 32.00 | 0.8970 | 31.41 | 0.9207 | 38.06 | 0.9757 |
| IMDN | ×2 | 694K | 158.8G | 38.00 | 0.9605 | 33.63 | 0.9177 | 32.19 | 0.8996 | 32.17 | 0.9283 | 38.88 | 0.9774 |
| LatticeNet | ×2 | 756K | 169.5G | 38.15 | 0.9610 | 33.78 | 0.9193 | 32.25 | 0.9005 | 32.43 | 0.9302 | - | - |
| SMSR | ×2 | 985K | 131.6G | 38.00 | 0.9601 | 33.64 | 0.9179 | 32.17 | 0.8990 | 32.19 | 0.9284 | 38.76 | 0.9771 |
| HEUN-S | ×2 | 226K | 45.9G | 37.93 | 0.9604 | 33.46 | 0.9170 | 32.13 | 0.8990 | 31.70 | 0.9245 | 38.60 | 0.9768 |
| HEUN-M | ×2 | 492K | 106.2G | 38.03 | 0.9604 | 33.60 | 0.9185 | 32.20 | 0.9000 | 32.09 | 0.9282 | 38.83 | 0.9775 |
| HEUN-L | ×2 | 714K | 151.1G | 38.09 | 0.9608 | 33.79 | 0.9198 | 32.25 | 0.9006 | 32.37 | 0.9307 | 39.07 | 0.9779 |
| HEUN-S+ | ×2 | 226K | 45.9G | 38.01 | 0.9605 | 33.54 | 0.9177 | 32.17 | 0.8994 | 31.84 | 0.9257 | 38.82 | 0.9774 |
| HPUN-M+ | ×2 | 492K | 106.2G | 38.08 | 0.9607 | 33.67 | 0.9190 | 32.24 | 0.9004 | 32.23 | 0.9294 | 39.03 | 0.9779 |
| HEUN-L+ | ×2 | 714K | 151.1G | 38.15 | 0.9610 | 33.87 | 0.9206 | 32.29 | 0.9010 | 32.54 | 0.9320 | 39.25 | 0.9783 |

FROM FIG. 14A

×3 Scaling Factor

| Method | Scale | #Params | Mult-Adds | PSNR | SSIM | PSNR | SSIM | PSNR | SSIM | PSNR | SSIM | PSNR | SSIM |
|---|---|---|---|---|---|---|---|---|---|---|---|---|---|
| Bicubic | ×3 | - | - | 30.39 | 0.8682 | 27.55 | 0.7742 | 27.21 | 0.7385 | 24.46 | 0.7349 | 26.95 | 0.8556 |
| SRCNN | ×3 | 57K | 52.7G | 32.75 | 0.9090 | 29.30 | 0.8215 | 28.41 | 0.7863 | 26.24 | 0.7989 | 30.48 | 0.9117 |
| VDSR | ×3 | 665K | 612.6G | 33.67 | 0.9210 | 29.78 | 0.8320 | 28.83 | 0.7990 | 27.14 | 0.8290 | 32.01 | 0.9340 |
| DRCN | ×3 | 1774K | 9788.7G | 33.82 | 0.9226 | 29.76 | 0.8311 | 28.80 | 0.7963 | 27.14 | 0.8279 | 32.24 | 0.9343 |
| DRRN | ×3 | 297K | 6797.0G | 34.03 | 0.9244 | 29.96 | 0.8349 | 28.95 | 0.8004 | 27.53 | 0.8378 | 32.74 | 0.9390 |
| MemNet | ×3 | 677K | 623.9G | 34.09 | 0.9248 | 30.01 | 0.8350 | 28.96 | 0.8001 | 27.56 | 0.8376 | 32.51 | 0.9369 |
| CARN | ×3 | 1592K | 118.8G | 34.29 | 0.9255 | 30.29 | 0.8407 | 29.06 | 0.8034 | 28.06 | 0.8493 | 33.50 | 0.9440 |
| IDN | ×3 | 553K | 57.0G | 34.11 | 0.9253 | 29.99 | 0.8354 | 28.95 | 0.8013 | 27.42 | 0.8359 | 32.71 | 0.9381 |
| SRFBN-S | ×3 | 375K | 686.4G | 34.20 | 0.9255 | 30.10 | 0.8372 | 28.96 | 0.8010 | 27.66 | 0.8415 | 33.02 | 0.9404 |
| IMDN | ×3 | 703K | 71.5G | 34.36 | 0.9270 | 30.32 | 0.8417 | 29.09 | 0.8046 | 28.17 | 0.8519 | 33.61 | 0.9445 |
| LatticeNet | ×3 | 756K | 76.3G | 34.53 | 0.9281 | 30.39 | 0.8424 | 29.15 | 0.8059 | 28.33 | 0.8538 | - | - |
| SMSR | ×3 | 993K | 67.8G | 34.40 | 0.9270 | 30.33 | 0.8412 | 29.10 | 0.8050 | 28.25 | 0.8536 | 33.68 | 0.9445 |
| HEUN-S | ×2 | 234K | 21.3G | 34.32 | 0.9262 | 30.25 | 0.8404 | 29.05 | 0.8036 | 27.80 | 0.8456 | 33.31 | 0.9425 |
| HEUN-M | ×2 | 500K | 48.1G | 34.39 | 0.9269 | 30.33 | 0.8420 | 29.11 | 0.8052 | 28.06 | 0.8508 | 33.54 | 0.9441 |
| HEUN-L | ×2 | 723K | 69.3G | 34.56 | 0.9281 | 30.45 | 0.8445 | 29.18 | 0.8072 | 28.37 | 0.8572 | 33.90 | 0.9463 |
| HEUN-S+ | ×2 | 234K | 21.3G | 34.39 | 0.9269 | 30.33 | 0.8417 | 29.09 | 0.8046 | 27.92 | 0.8477 | 32.58 | 0.9441 |
| HPUN-M+ | ×2 | 500K | 48.1G | 34.47 | 0.9276 | 30.41 | 0.8432 | 29.15 | 0.8060 | 28.18 | 0.8529 | 33.81 | 0.9457 |
| HEUN-L+ | ×2 | 723K | 69.3G | 34.63 | 0.9287 | 30.52 | 0.8455 | 29.22 | 0.8080 | 28.49 | 0.8592 | 34.12 | 0.9476 |

×4 Scaling Factor

| Method | Scale | #Params | Mult-Adds | PSNR | SSIM | PSNR | SSIM | PSNR | SSIM | PSNR | SSIM | PSNR | SSIM |
|---|---|---|---|---|---|---|---|---|---|---|---|---|---|
| Bicubic | ×4 | - | - | 28.42 | 0.8104 | 26.00 | 0.7027 | 25.96 | 0.6675 | 23.14 | 0.6577 | 24.89 | 0.7866 |
| SRCNN | ×4 | 57K | 52.7G | 30.48 | 0.8628 | 27.50 | 0.7513 | 26.90 | 0.7101 | 24.52 | 0.7221 | 27.58 | 0.8555 |
| VDSR | ×4 | 665K | 612.6G | 31.35 | 0.8830 | 28.02 | 0.7680 | 27.29 | 0.7260 | 25.18 | 0.7540 | 28.83 | 0.8870 |
| DRCN | ×4 | 1774K | 9788.7G | 31.53 | 0.8854 | 28.02 | 0.7670 | 27.23 | 0.7233 | 25.18 | 0.7524 | 28.93 | 0.8854 |
| DRRN | ×4 | 297K | 6797.0G | 31.68 | 0.8888 | 28.21 | 0.7720 | 27.38 | 0.7284 | 25.44 | 0.7638 | 29.46 | 0.8960 |
| LapSRN | ×4 | 813K | 149.4G | 31.54 | 0.8850 | 28.19 | 0.7720 | 27.32 | 0.7280 | 25.21 | 0.7560 | 29.09 | 0.8845 |
| MemNet | ×4 | 677K | 623.9G | 31.74 | 0.8893 | 28.26 | 0.7723 | 27.40 | 0.7281 | 25.50 | 0.7630 | 29.42 | 0.8942 |
| CARN | ×4 | 1592K | 90.9G | 32.13 | 0.8937 | 28.60 | 0.7806 | 27.58 | 0.7349 | 26.07 | 0.7837 | 30.47 | 0.9084 |
| IDN | ×4 | 553K | 32.3G | 31.82 | 0.8903 | 28.25 | 0.7730 | 27.41 | 0.7297 | 25.41 | 0.7632 | 29.41 | 0.8942 |
| SRFBN-S | ×4 | 483K | 852.9G | 31.98 | 0.8923 | 28.45 | 0.7779 | 27.44 | 0.7313 | 25.71 | 0.7719 | 29.91 | 0.9008 |
| IMDN | ×4 | 715K | 40.9G | 32.21 | 0.8948 | 28.58 | 0.7811 | 27.56 | 0.7353 | 26.04 | 0.7838 | 30.45 | 0.9075 |
| LatticeNet | ×4 | 777K | 43.6G | 32.30 | 0.8962 | 28.68 | 0.7830 | 27.62 | 0.7367 | 26.25 | 0.7873 | - | - |
| SMSR | ×4 | 1006K | 41.6G | 32.12 | 0.8932 | 28.55 | 0.7808 | 27.55 | 0.7351 | 26.11 | 0.7868 | 30.54 | 0.9085 |
| HEUN-S | ×4 | 246K | 12.7G | 32.00 | 0.8821 | 28.50 | 0.7792 | 27.51 | 0.7339 | 25.79 | 0.7769 | 30.14 | 0.9038 |
| HEUN-M | ×4 | 511K | 27.7G | 32.19 | 0.8946 | 28.61 | 0.7818 | 27.58 | 0.7364 | 26.04 | 0.7851 | 30.49 | 0.9078 |
| HEUN-L | ×4 | 734K | 39.7G | 32.31 | 0.8962 | 28.73 | 0.7842 | 27.66 | 0.7386 | 26.27 | 0.7918 | 30.77 | 0.9103 |
| HEUN-S+ | ×4 | 246K | 12.7G | 32.14 | 0.8940 | 28.60 | 0.7808 | 27.56 | 0.7350 | 25.90 | 0.7796 | 30.43 | 0.9070 |
| HPUN-M+ | ×4 | 511K | 27.7G | 32.29 | 0.8959 | 28.69 | 0.7833 | 27.64 | 0.7377 | 26.15 | 0.7877 | 30.74 | 0.9106 |
| HEUN-L+ | ×4 | 734K | 39.7G | 32.40 | 0.8974 | 28.80 | 0.7856 | 27.70 | 0.7397 | 26.38 | 0.7943 | 31.00 | 0.9133 |

FIG. 14B

SYSTEM AND METHOD FOR IMAGE SUPER-RESOLUTION

RELATED APPLICATION

This application claims the benefit of U.S. Provisional Application No. 63/264,058, filed on Nov. 15, 2021. The entire teachings of the above application are incorporated herein by reference.

BACKGROUND

Single-Image Super-Resolution (SISR) is a fundamental vision task to reconstruct a single, reliable high-resolution (HR) image from a single, low-resolution (LR) image. SISR has been utilized on various high-level tasks, such as face synthesis, medical imaging, surveillance imaging, and image generation for non-limiting examples.

SUMMARY

According to an example embodiment, a method for performing image super-resolution (SR) comprises performing image SR on a low-resolution (LR) representation of a high-resolution (HR) original image. The HR original image is at a higher resolution relative to a resolution of the LR representation. The image SR includes producing a reconstructed version of the HR original image based on element-unshuffled downsampling of the LR representation. The method further comprises outputting the reconstructed version produced.

The element-unshuffled downsampling may include performing an element-unshuffle operation. The element-unshuffle operation may include downsampling input features. The input features may include elements from a transformed version of the LR representation. The downsampling may include reducing a size of the input features by separating the input features into sub-features.

The separating may include selecting a subset of elements from an input feature of the input features and creating a sub-feature of the sub-features by grouping the subset of elements selected.

The image SR may further include performing the element-unshuffled downsampling. The element-unshuffled downsampling may produce a plurality of sub-features from input features. The input features may include elements from a transformed version of the LR representation.

The image SR may further include performing a max-pooling operation on the sub-features of the plurality of sub-features to produce a plurality of pooled sub-features. The image SR may further include convolving, using group convolution, pooled sub-features of the plurality of pooled sub-features. The convolving may include outputting low-frequency features. The image SR may further include upsampling the low-frequency features output from the convolving to produce up-sampled low-frequency features. The low-frequency features may be at a lower frequency relative to a frequency of the input features. The image SR may further include producing enhanced features by adding the up-sampled low-frequency features to the input features.

The image SR may further include producing the reconstructed version based on the enhanced features produced.

The element-unshuffled downsampling may include performing an element-unshuffle operation. The element-un-shuffle operation may enable the element-unshuffled down-sampling that yields higher performance relative to a performance based on downsampling via a different downsampling operation different from the element-unshuffled downsampling. The higher performance may include higher image quality.

The image SR may be performed in a non-recurrent, feed-forward manner.

According to another example embodiment, a system for performing image super-resolution (SR) comprises an ele-ment-unshuffled downsampler and an image SR module. The image SR module is configured to perform image SR on a low-resolution (LR) representation of a high-resolution (HR) original image. The HR original image is at a higher resolution relative to a resolution of the LR representation. The image SR module is further configured to produce a reconstructed version of the HR original image via the image SR performed. The image SR is based on element-unshuffled downsampling of the LR representation. The element-unshuffled downsampler is configured to perform the element-unshuffled downsampling. The image SR mod-ule is further configured to output the reconstructed version produced.

Alternative system embodiments parallel those described above in connection with the example method embodiment.

According to yet another example embodiment, a non-transitory computer-readable medium for performing image super-resolution (SR) has encoded thereon a sequence of instructions which, when loaded and executed by at least one processor, causes the at least one processor to perform image SR on a low-resolution (LR) representation of a high-resolution (HR) original image. The HR original image is at a higher resolution relative to resolution of the LR repre-sentation. The image SR includes producing a reconstructed version of the HR original image based on element-un-shuffled downsampling of the LR representation. The sequence of instructions further causes the at least one processor to output the reconstructed version produced.

Alternative non-transitory computer-readable medium embodiments parallel those described above in connection with the example method embodiment.

It should be understood that example embodiments dis-closed herein can be implemented in the form of a method, apparatus, system, or computer readable medium with pro-gram codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illus-trated in the accompanying drawings in which like reference characters refer to the same parts throughout the different views. The drawings are not necessarily to scale, emphasis instead being placed upon illustrating embodiments.

FIG. 3 is a flow diagram of an example embodiment of a method for performing image SR.

FIGS. 11A-F are charts with exemplifications of a relationship between PSNR and Normalized Mean Error (NME).

FIG. 12A-1 is an exemplification of an image of a baby.

FIGS. 12A-2 through 12A-8 are exemplifications of NME visualizations for the image of FIG. 12A-1.

FIG. 12B-1 is an exemplification of an image of a butterfly.

FIGS. 12B-2 through 12B-8 are exemplifications of NME visualizations for the image of FIG. 12B-1.

FIG. 12C-1 is an exemplification of an image of a bird.

FIGS. 12C-2 through 12C-8 are exemplifications of NME visualizations for the image of FIG. 12C-1.

FIG. 12D-1 is an exemplification of an image of a head.

FIGS. 12D-2 through 12D-8 are exemplifications of NME visualizations for the image of FIG. 12D-1.

FIG. 12E-1 is an exemplification of an image of a woman.

FIGS. 12E-2 through 12E-8 are exemplifications of NME visualizations for the image of FIG. 12E-1.

FIG. 13A-1 is an exemplification of an image of an urban scene.

FIGS. 13A-2 through 13A-11 are exemplifications of visualization results for the image of FIG. 13A-1 with different SR methods.

FIG. 13B-1 is an exemplification of an image of another urban scene.

FIGS. 13B-2 through 13B-11 are exemplifications of visualization results for the image of FIG. 13B-1 with different SR methods.

FIG. 13C-1 is an exemplification of an image of yet another urban scene.

FIGS. 13C-2 through 13C-11 are exemplifications of visualization results for the image of FIG. 13C-1 with different SR methods.

FIG. 13D-1 is an exemplification of an image of cartoon.

FIGS. 13D-2 through 13D-11 are exemplifications of visualization results for the image of FIG. 13D-1 with different SR methods.

FIGS. 14A-B are a table with an exemplification of benchmark results with a bicubic (BI) degradation model.

DETAILED DESCRIPTION

Figure 1:
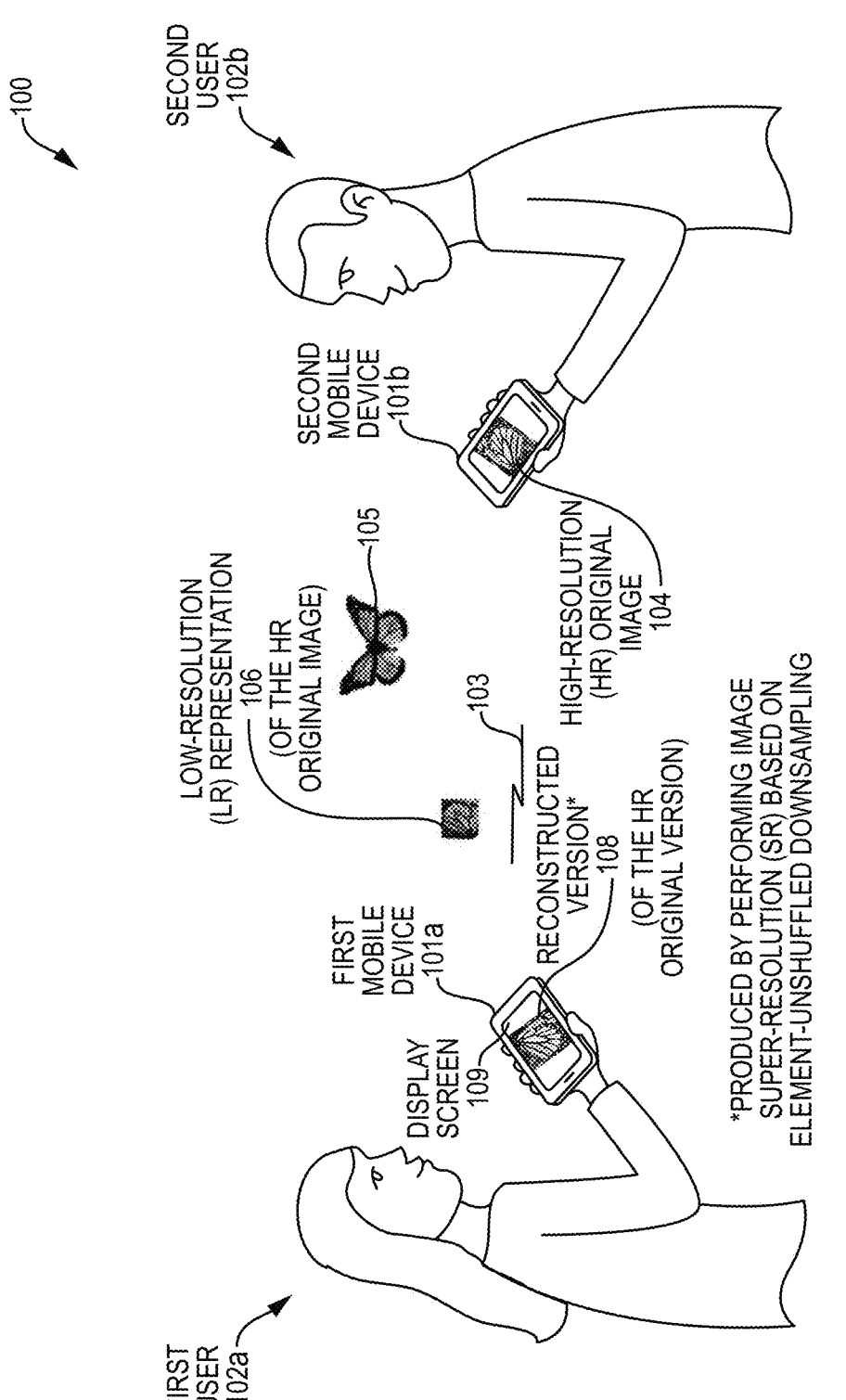
FIG. 1 is a block diagram of an example embodiment of an environment in which a mobile device performs image super-resolution (SR) optionally within an embodiment dis-closed herein.

A description of example embodiments follows.

It should be understood that the terms "element-un-shuffle" and "element-unshuffled" may be used interchangeably herein with the terms "pixel-unshuffle" and "pixel-unshuffled," respectively, in an event the "element" of such terms is a picture element (pixel). It should be understood, however, that an image disclosed herein is not limited to a picture and, thus, an element thereof is not limited to a pixel.

Convolutional neural network (CNN) has achieved great success on image super-resolution (SR). However, most deep CNN-based SR models take massive computations to obtain high performance. Down-sampling features for multi-resolution fusion is an efficient and effective way to improve the performance of visual recognition. Still, it is counter-intuitive to downsample in the SR task, which needs to project a low-resolution input to high-resolution. An example embodiment disclosed herein includes a novel Hybrid Element-Unshuffled Network (HEUN) that introduces an efficient and effective downsampling module into the SR task. The network may include element-unshuffled downsampling and Self-Residual Depthwise Separable Convolutions. An example embodiment may utilize an element-unshuffle operation to downsample input features and use grouped convolution to reduce the channels. An example embodiment may further enhance a depthwise convolution's performance by adding the input features to its output. Experiments on benchmark datasets disclosed further below show that an example embodiment of HEUN disclosed herein achieves and surpasses the state-of-the-art (SOTA) reconstruction performance with fewer parameters and computation costs relative to conventional SR. An overview of SR is provided below.

1 Single Image Super-Resolution (SISR) Overview

Single Image Super-Resolution (SISR) is a fundamental vision task to reconstruct a faithful high-resolution (HR) image from a low-resolution (LR) image. SISR has been utilized on various high-level tasks, such as face synthesis (Yu Yin, et al., "Joint super-resolution and alignment of tiny faces. In AAAI, 2020, Yu Yin, et al., "Superfront: From low-resolution to high-resolution frontal face synthesis. In ACMMM, 2021), medical imaging (Wenzhe Shi, et al., "Cardiac image super-resolution with global correspondence using multi-atlas patchmatch. In MICCAI, 2013), surveillance imaging (Wilman W W Zou and Pong C Yuen. "Very low resolution face recognition problem," TIP, 2012), and image generation (Karras, et al., "Progressive growing of gans for improved quality, stability, and variation. Submitted to ICLR 2018, 2017). Dong et al. (Chau, et al., "Learning a deep convolutional network for image super-resolution. In ECCV, 2014) first introduced CNN into SISR and achieved impressive performance in 2014. Afterwards, more deep CNN methods are proposed for the super-resolution tasks (Schulter, et al., "Fast and accurate image upscaling with super-resolution forests," In CVPR, 2015, Huang et al., "Single image super-resolution from trans-formed self-exemplars. In CVPR, 2015, Kim, et al., "Accurate image super-resolution using very deep convolutional networks. In CVPR, 2016, Kim, et al., "Deeply-recursive convolutional network for image super-resolution. In CVPR, 2016, Lim, et al., "Enhanced deep residual networks for single image super-resolution," In CVPRW, 2017, Tong, et al., "Image super-resolution using dense skip connection. In ICCV, 2017, Tai, et al., "Memnet: A persistent memory network for image restoration," In ICCV, 2017, Zhang et al., "Learning a single convolutional super-resolution network for multiple degradations," Inc CVPR, 2018, Zhang et al., "Image super-resolution using very deep residual channel attention networks," In ECCV, 2018). Among these, one of the most fundamental architectures is EDSR (Lim, et al., "Enhanced deep residual networks for single image super-resolution, In CVPRW, 2017). However, these networks need expensive computation resources, which is the main bottleneck for their deployment on mobile devices.

Figure 4:
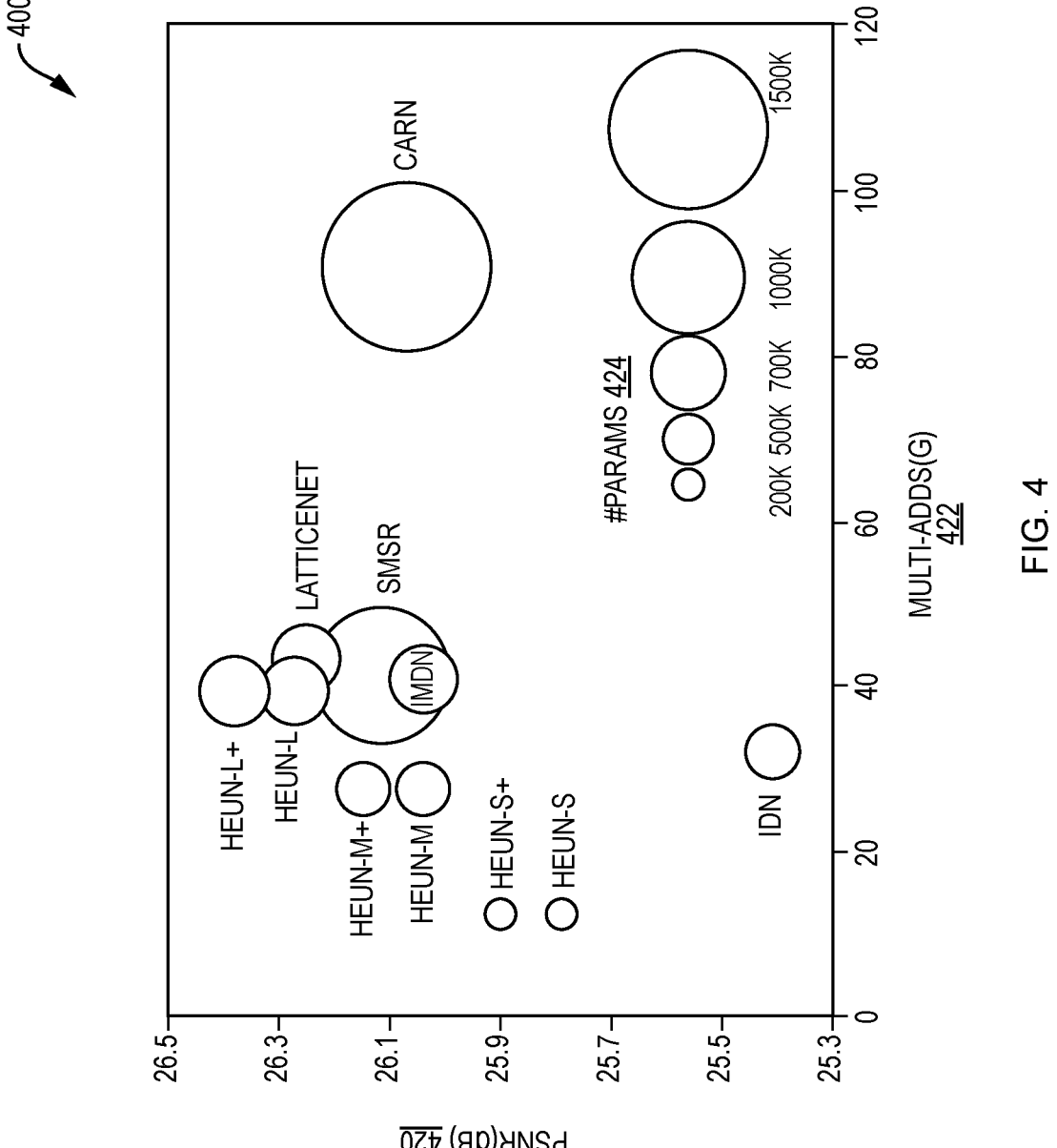
FIG. 4 is a graph with an exemplification of peak signal-to-noise ratio (PSNR) vs. a number of Multi-Adds for different SR methods.

Manually designed lightweight structures have been proposed (Sifre, et al., "Rigid-motion scattering for image classification, PhD theses, Citeseet, 2014, Howard, et al., "Mobilenets: Efficient convolutional neural networks for mobile vision applications," CoRR, abs/1704.04861, 2017, Chollet, "Xception: Deep Learning with depthwise separable convolutions," In CVPR, 2017, Iandola, et al., "Squeezenet: Alexnet-level accuracy with 50× fewer parameters and 0.5 mb model size," ICLR, 2017, Kim, et al., "Accurate image super-resolution using very deep convolutional networks," In CVPR, 2016, Mark Sandler, et al., Inverted residuals and linear bottlenecks: Mobile networks for classification, detection and segmentation. CVPR, 2018, Xiangyu Zhang, et al., "Shufflenet: An extremely efficient convolutional neural network for mobile devices," In CVPR, 2018, Ningning Ma, et al., "Shufflenet v2: Practical guidelines for efficient cnn architecture design," In ECCV, 2018, Andrew Howard, et al., "Searching for mobilenetv3," In ICCV, 2019, Tero Karras, et al., "Progressive growing of gans for improved quality, stability, and variation," submitted to ICLR 2018, 2017, Kai Han, et al., "Ghostnet: More features from cheap operations," In CVPR, 2020). Among these structures, the most fundamental one is the depthwise convolution layer (Laurent Sifre and P S Mallat. "Rigid-motion scattering for image classification," PhD thesis, Citeseer, 2014), which processes the spatial information with a single convolution on each input feature. A 1×1 convolution layer named pointwise layer is usually deployed around the depthwise convolution layer for the communication among channels (Andrew G Howard, et al., "Mobilenets: Efficient convolutional neural networks for mobile vision applications," CoRR, abs/1704.04861, 2017, Mark Sandler, et al., "Inverted residuals and linear bottlenecks: Mobile networks for classification, detection and segmentation," CVPR, 2018, Andrew Howard, et al., "Searching for mobilenetv3," In ICCV, 2019, Xiangyu Zhang, et al., "Shufflenet: An extremely efficient convolutional neural network for mobile devices," In CVPR, 2018, Ningning Ma, et al., "Shufflenet v2: Practical guidelines for efficient cnn architecture design," In ECCV, 2018). However, such structures are not popular in the SISR due to their significant performance loss. CARN (Namhyuk Ahn, et al., "Fast, accurate, and lightweight super-resolution with cascading residual network," In ECCV, 2018) tried to use a similar structure as MobileNet (Andrew G Howard, et al., "Mobilenets: Efficient convolutional neural networks for mobile vision applications," CoRR, abs/1704.04861, 2017) on SISR in 2018. They utilized the group convolution to reduce the parameters, but they had to introduce a complicated recurrent method to improve the performance. As shown in FIG. 4, disclosed further below, the computation costs and parameters of CARN are not satisfied. Therefore, it is still a main challenge to effectively implement depthwise convolution based lightweight structures to the image super-resolution (SR) task.

Besides using lightweight operations, the computation costs can be alleviated by reducing the size of feature maps (Mingxing Tan and Quoc Le. "Efficientnet: Rethinking model scaling for convolutional neural networks," In ICML, 2019, Andrew G Howard, et al., "Mobilenets: Efficient convolutional neural networks for mobile vision applications," CoRR, abs/1704.04861, 2017, Francois Chollet.

"Xception: Deep learning with depthwise separable convolutions," In CVPR, 2017, Forrest N Iandola, et al., "Squeezenet: Alexnet-level accuracy with 50× fewer parameters and 0.5 mb model size," ICLR, 2017, Mark Sandler, et al., "Inverted residuals and linear bottlenecks: Mobile networks for classification, detection and segmentation," CVPR, 2018, Xiangyu Zhang, et al., "Shufflenet: An extremely efficient convolutional neural network for mobile devices," In CVPR, 2018, Ningning Ma, et al., "Shufflenet v2: Practical guidelines for efficient cnn architecture design," In ECCV, 2018, Andrew Howard, et al., "Searching for mobilenetv3," In ICCV, 2019, Mingxing JTan and Quoc V Le. "Mixnet: Mixed depthwise convolutional kernels," In BMVC, 2019, Kai Han, et al., "Ghostnet: More features from cheap operations," In CVPR, 2020). Meanwhile, size-reduced features can also improve high-level representations by merging with higher-resolution features in many tasks (Ke Sun, et al., "Deep high-resolution representation learning for human pose estimation," In CVPR, 2019, Jingdong Wang, et al., "Deep high-resolution representation learning for visual recognition," IEEE transactions on pattern analysis and machine intelligence, 43(10):3349-3364, 2020). However, it is counter-intuitive to apply downsampling modules in SISR, since SISR is an upsampling task that restores information of a low-resolution image. In contrast, the downsampling operation usually causes significant information loss. (Muhammad Haris, et al., "Deep back-projection networks for super-resolution," In CVPR, 2018) proposed an iterative error-correcting feedback mechanism that calculates both up- and down-projection errors to guide the reconstruction. Furthermore, Li et al. (Zhen Li, et al., "Feedback network for image super-resolution," In CVPR, 2019) also proposed a framework that introduced the down-sampling module into SISR to generate high-level representations. Their success shows the possibility of getting pleasing high-resolution images through downsampling operations. However, they still had to utilize a recurrent method to resist the performance drop, which heavily increased the parameters and computation costs. An example embodiment disclosed herein enables image SR to generate a reliable (accurate) high-level representation with reduced parameters and computation cost relative to conventional SR enabling such image SR to be implemented, for non-limiting example, on a mobile device, such as disclosed below with regard to FIG. 1.

FIG. 1 is block diagram of an example embodiment of an environment 100 in which a mobile device, namely a first mobile device 101a, performs image super-resolution (SR) optionally within an embodiment disclosed herein. In the environment 100 there are two users, namely a first user 102a and a second user 102b. The first user 102a and second user 102b are communicating, electronically, over a wireless connection 103, via the first mobile device 101a and a second mobile device 101b, respectively. The second user 102b has captured a high-resolution (HR) original image 104 of a butterfly 105 via the second mobile device 101b and uses the second mobile device 101b to transmit a low-resolution (LR) representation 106 of the HR original image 104 to the first mobile device 101a of the first user 102a. It should be understood that an example embodiment disclosed herein is not limited to being performed by a mobile device, that a subject of an image is not limited to a butterfly, and that a HR original image is not limited to a picture captured by a camera.

Continuing with reference to FIG. 1, the first mobile device 101a is configured to perform image SR on the LR representation 106 received by the first mobile device 101a and output a reconstructed version 108 of the HR original image 104 to a display screen 109 of the first mobile device 101*a*, for the first user 102*a* to view. It should be understood that the HR original image 104 is not limited to being output to a display screen and may, for non-limiting example, be output to an electronic file.

In the example embodiment of FIG. 1, the first mobile device 101*a* is configured to produce, via the image SR performed, the reconstructed version 108 of the HR original image 104 based on element-unshuffled downsampling of the LR representation 106. The reconstructed version 108 is a higher quality version of the HR original image 104 relative to the LR representation 106. The element-unshuffled downsampling enables the first mobile device 101*a* to advantageously perform the image SR with fewer parameters and less computation cost relative to conventional image SR, thereby reducing an amount of resources and power of the first mobile device 101*a* used for such an application. According to an example embodiment, a system may perform image SR based on such element-unshuffled downsample, as disclosed below with regard to FIG. 2.

Figure 2:
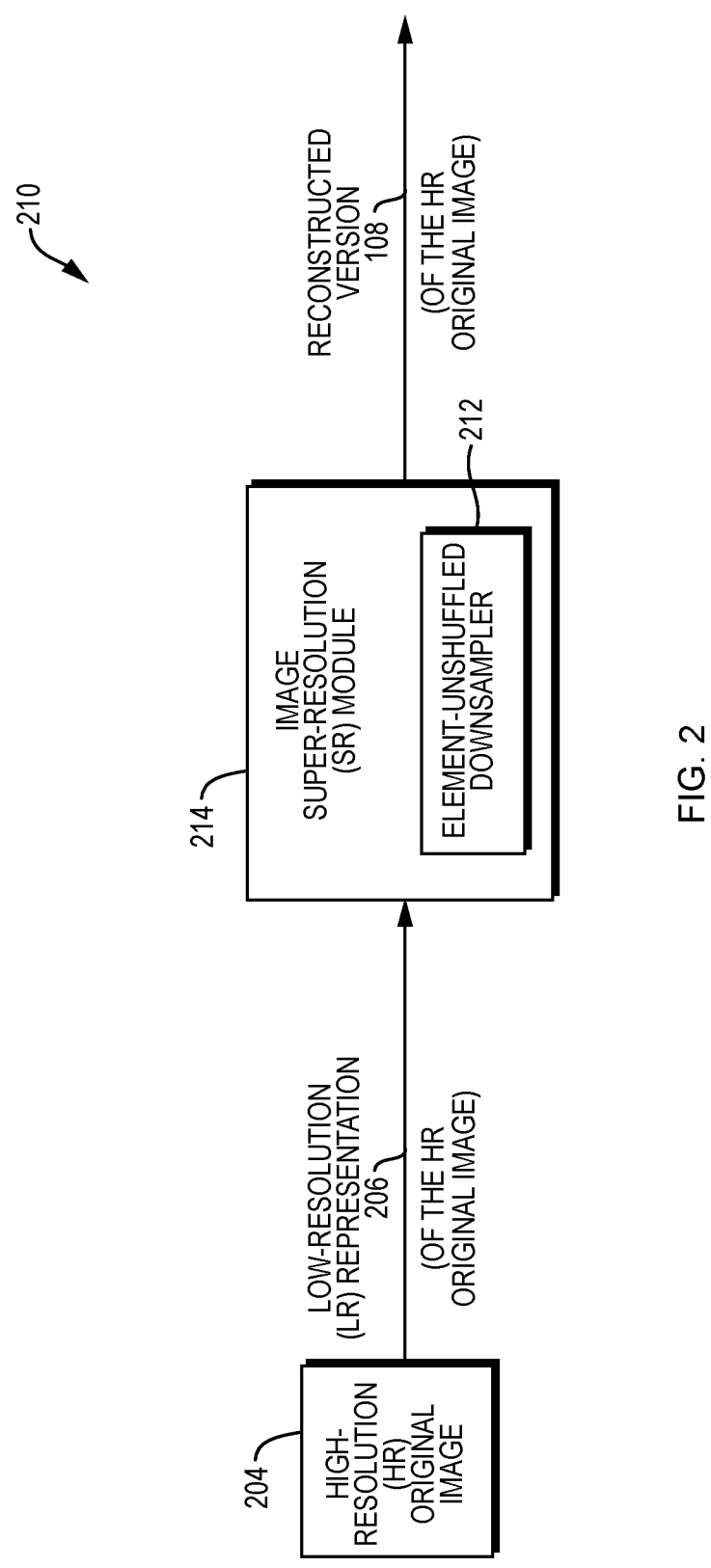
FIG. 2 is a block diagram of an example embodiment of a system for performing image SR.

FIG. 2 is a block diagram of an example embodiment of a system 210 for performing image super-resolution (SR). The system 210 comprises an element-unshuffled downsampler 212 and an image SR module 214. The image SR module 214 is configured to perform image SR on a low-resolution (LR) representation 206 of a high-resolution (HR) original image 204. The HR original image 204 is at a higher resolution relative to a resolution of the LR representation 206. The image SR module 214 is further configured to produce a reconstructed version 108 of the HR original image 204 via the image SR performed. The image SR is based on element-unshuffled downsampling of the LR representation 206. The element-unshuffled downsampler 212 is configured to perform the element-unshuffled downsampling. The image SR module 214 is further configured to output the reconstructed version 108 produced.

To perform the element-unshuffled downsampling, the element-unshuffled downsampler 212 may be further configured to perform an element-unshuffle operation (not shown). The element-unshuffle operation may enable the element-unshuffled downsampling that yields higher performance relative to a performance based on downsampling via a different downsampling operation, different from the element-unshuffled downsampling. Such element-unshuffled downsampling is disclosed further below with regard to equations (3)-(5). The higher performance may include higher image quality as disclosed further below. An example embodiment of a method that may perform image SR in such manner is disclosed below with regard to FIG. 3.

FIG. 3 is a flow diagram of an example embodiment of a method 300 for performing image super-resolution (SR). The method begins (302) and comprises performing image SR on a low-resolution (LR) representation of a high-resolution (HR) original image (304). The HR original image is at a higher resolution relative to a resolution of the LR representation. The image SR includes producing a reconstructed version of the HR original image based on element-unshuffled downsampling of the LR representation. The method further comprises outputting the reconstructed version produced (306) and the method thereafter ends (308) in the example embodiment. Further technical details are disclosed below.

An example embodiment disclosed herein includes an effective way to design a lightweight network with depthwise convolutions and downsampling operations. An example embodiment disclosed herein may include an effective module referred to as Self-Residual Depthwise Separable Convolution to overcome the drawback in Depthwise Separable Convolution (DSC) (Andrew G Howard, et al., "Mobilenets: Efficient convolutional neural networks for mobile vision applications," CoRR, abs/1704.04861, 2017) without any additional parameters. Previous explorations on downsampling features include (Ke Sun, et al., "Deep high-resolution representation learning for human pose estimation," In CVPR, 2019, Muhammad Haris, et al., "Deep back-projection networks for super-resolution," In CVPR, 2018, Zhen Li, et al., "Feedback network for image super-resolution," In CVPR, 2019). In contrast, an example embodiment disclosed herein includes an element-unshuffled downsampler, such as the element-unshuffled downsampler 212 of FIG. 2, disclosed above, configured to perform an element-unshuffle operation and may include max-pooling and group convolution to further enhance the performance of DSC with similar computation costs as depthwise convolution. Such an example embodiment is disclosed further below with regard to FIG. 5. The element-unshuffle operation is the reverse (inverse) operation of pixel-shuffle (Wenzhe Shi, et al., "Real-time single image and video super-resolution using an efficient sub-pixel convolutional neural network," In CVPR, 2016). Moreover, an example embodiment disclosed herein includes a practical, lightweight module referred to as an Element-Unshuffled Block (EUB) that may include the element-unshuffled downsampling and the Self-Residual DSC (SRDSC). An example embodiment disclosed further below may replace one Self-Residual DSC in the EUB with a standard convolution layer and construct a Hybrid Element-Unshuffled Network (HEUN) to achieve the state-of-the-art (SOTA) performance and slightly increase the performance number of the HEUN to beyond the SOTA performance. The overall comparison is shown in FIG. 4, disclosed below.

FIG. 4 is a graph 400 with an exemplification of peak signal-to-noise ratio (PSNR) vs. a number of Multi-Adds 422 for different SR methods. The graph 400 provides an illustration of the overall comparison on the Urban100 dataset with ×4 scale. An example embodiment of HEUN-L, disclosed further below, achieves the best trade-off among the PSNR 420, parameters 424, and Multi-Adds 422. In the graph 400, the "+" symbol means the PSNR 420 results are generated with self-ensemble. Example embodiments are summarized below for non-limiting example and disclosed in detail, further below.

an example embodiment of the Self-Residual DSC may be used to overcome the defects of the depthwise convolution in the SISR task with a simple and effective operation, which barely needs computation and additional parameters.

an example embodiment may employ a downsampling module with the element-unshuffle operation, which is useful to enhance the performance.

an example embodiment of a lightweight module, referred to interchangeably herein as EUB, may be employed with an example embodiment of a Self-Residual DSC and the element-unshuffled downsampler, which can provide reliable performance with fewer parameters and computation costs compared to conventional SR.

an example embodiment of the Hybrid Element-Unshuffled Block (EPUB) may include integrating the standard convolution into the EUB and constructing the effective and efficient HEUN to achieve a new SOTA performance with fewer parameters and Multi-Adds compared to the baselines.

Further, a relationship between PSNR and the Normalized Mean Error (NME) among the shallow features and deep features based on an ablation study is disclosed herein, which may be valuable in designing a network for SISR. Details regarding same are disclosed further below in Section 4.2. An overview of SR and deep lightweight structure for use in same is disclosed below.

2 Super Resolution and Deep Lightweight Structure 2.1 Super Resolution

Deep Super Resolution. An end-to-end mapping between the interpolated LR images and their HR counterparts was first established by SRCNN (Chao Dong, et al., "Learning a deep convolutional network for image super-resolution," In ECCV, 2014). The SRCNN was further improved by its successors with advanced network architectures (Jiwon Kim, et al., "Accurate image super-resolution using very deep convolutional networks," In CVPR, 2016, Kai Zhang, et al., "Learning deep cnn denoiser prior for image restoration," In CVPR, 2017). As studied in (Chao Dong, et al. "Accelerating the super-resolution convolutional neural network," In ECCV, 2016), computational costs are quadratically increased by this upsampling operation in data pre-processing. To solve the problem, an efficient sub-pixel convolution layer that upsampled the last LR feature maps to HR was introduced in ESPCN (Wenzhe Shi, et al., "Real-time single image and video super-resolution using an efficient sub-pixel convolutional neural network," In CVPR, 2016). It was also adopted in residual-learning networks SRResNet (Christian Ledig, et al., "Photo-realistic single image super-resolution using a generative adversarial network," In CVPR, 2017) and EDSR (Bee Lim, et al., "Enhanced deep residual networks for single image super-resolution. In CVPRW, 2017). The performance of the SISR was then further improved by stacking more blocks with dense residuals (Ke Zhang, et al., "Residual networks of residual networks: Multilevel residual networks," TCSVT, 2017, He Zhang and Vishal M Patel. "Densely connected pyramid dehazing network," In CVPR, 2018, Yulun Zhang, et al., "Residual dense network for image super-resolution," In CVPR, 2018, Yulun Zhang, et al., "Residual non-local attention networks for image restoration,". In ICLR, 2019). Lightweight Super Resolution. LapSRN (Wei-Sheng Lai, et al., "Deep laplacian pyramid networks for fast and accurate super-resolution," In CVPR, 2017) reduced the computation complexity by removing the bicubic interpolation before prediction. Inspired by Lap-SRN, a lot of works started to reconstruct the HR image from the origin LR input. Recursive learning was first introduced by DRCN (Jiwon Kim, et al., "Deeply-recursive convolutional network for image super-resolution," In CVPR, 2016). Then it was widely used to reduce the parameters with weight sharing strategy (Ying Tai, et al., "Image super-resolution via deep recursive residual network," In CVPR, 2017, Ying Tai, et al., "Memnet: A persistent memory network for image restoration," In ICCV, 2017, Muhammad Haris, et al., "Deep back-projection networks for super-resolution," In CVPR, 2018, Namhyuk Ahn, et al., "Fast, accurate, and lightweight super-resolution with cascading residual network," In ECCV, 2018, Zhen Li, et al., "Feedback network for image super-resolution," In CVPR, 2019). Besides the recurrent method, IDN (Zheng Hui, et al., "Fast and accurate single image super-resolution via information distillation network,". In CVPR, 2018) and CARN (Namhyuk Ahn, et al., "Fast, accurate, and lightweight super-resolution with cascading residual network," In ECCV, 2018) introduced the group convolution for the lightweight purpose. Further to the success of the residual operation in SISR, many works (Zheng Hui, et al., "Fast and accurate single image super-resolution via information distillation network,". In CVPR, 2018, Zheng Hui, et al., "Lightweight image super-resolution with information multi-distillation network," In ACMMM, 2019, Xiaotong Luo, et al., "Latticenet: Towards lightweight image super-resolution with lattice block," In ECCV, 2020) adopted the residual into their lightweight design to keep the performance. A recent work named SMSR (Longguang Wang, et al., "Exploring sparsity in image super-resolution for efficient inference," In CVPR, 2021) reduced the parameters and computation costs with pruning. Different from SMSR, an example embodiment disclosed herein may include a design of the lightweight network which can be further improved by pruning.

2.2 Deep Lightweight Structure

As the deep-learning models become deeper and larger, many researchers have been working on the lightweight networks. A faster activation function named rectified-linear activation function (ReLU) was proposed to accelerate the model in (Xavier Glorot, et al., "Deep sparse rectifier neural networks," In AISTATS, 2011). A flattened CNN architecture that accelerated the feeding forward was presented in (Jonghoon Jin, et al., "Flattened convolutional neural networks for feedforward acceleration," CoRR, 2014). Depth-wise separable convolution was first proposed in (Laurent Sifre and P S Mallat. "Rigid-motion scattering for image classification," PhD thesis, Citeseer, 2014) and was widely adopted in Inception models (Sergey Ioffe and Christian Szegedy. "Batch normalization: Accelerating deep network training by reducing internal covariate shift," In ICML, 2015), Xception net-work (Francois Chollet. "Xception: Deep learning with depthwise separable convolutions," In CVPR, 2017), MobileNets (Andrew G Howard, et al., "Mobilenets: Efficient convolutional neural networks for mobile vision applications," CoRR, abs/1704.04861, 2017, Mark Sandler, et al., "Inverted residuals and linear bottlenecks: Mobile networks for classification, detection and segmentation," CVPR, 2018), ShuffleNets (Xiangyu Zhang, et al., "Shufflenet: An extremely efficient convolutional neural network for mobile devices," In CVPR, 2018, Ningning Ma, et al., "Shufflenet v2: Practical guidelines for efficient cnn architecture design," In ECCV, 2018) and CondenseNet (Gao Huang, et al., "Condensenet: An efficient densenet using learned group convolutions," In CVPR, June 2018). Besides manually designed lightweight architectures, researchers proposed to use Neural Architecture Search (NAS) to find the optimal lightweight network (Hanxiao Liu, et al., "Darts: Differentiable architecture search," In ICLR, 2019, Barret Zoph, Vijay Vasudevan, Jonathon Shlens, and Quoc V Le. "Learning transferable architectures for scalable image recognition," In CVPR, 2018, Han Cai, Ligeng Zhu, and Song Han. "Proxylessnas: Direct neural architecture search on target task and hardware," In ICLR, 2019, Bichen Wu, et al., "Fbnet: Hardware-aware efficient convnet design via differentiable neural architecture search," In CVPR, 2019, Andrew Howard, et al., "Searching for mobilenetv3," In ICCV, 2019, Mingxing JTan and Quoc V Le. "Mixnet: Mixed depthwise convolutional kernels," In BMVC, 2019). All these networks are constructed based on the depthwise convolution as well. Thus, it is useful to explore an effective way to implement the depthwise convolution on SISR. An example embodiment disclosed herein includes a downsampling module which can significantly enhance the performance based on the depthwise convolution, such as the element-unshuffled downsampler 212, disclosed above with regard to FIG. 2, and below with regard to FIG. 5.

Figure 5:
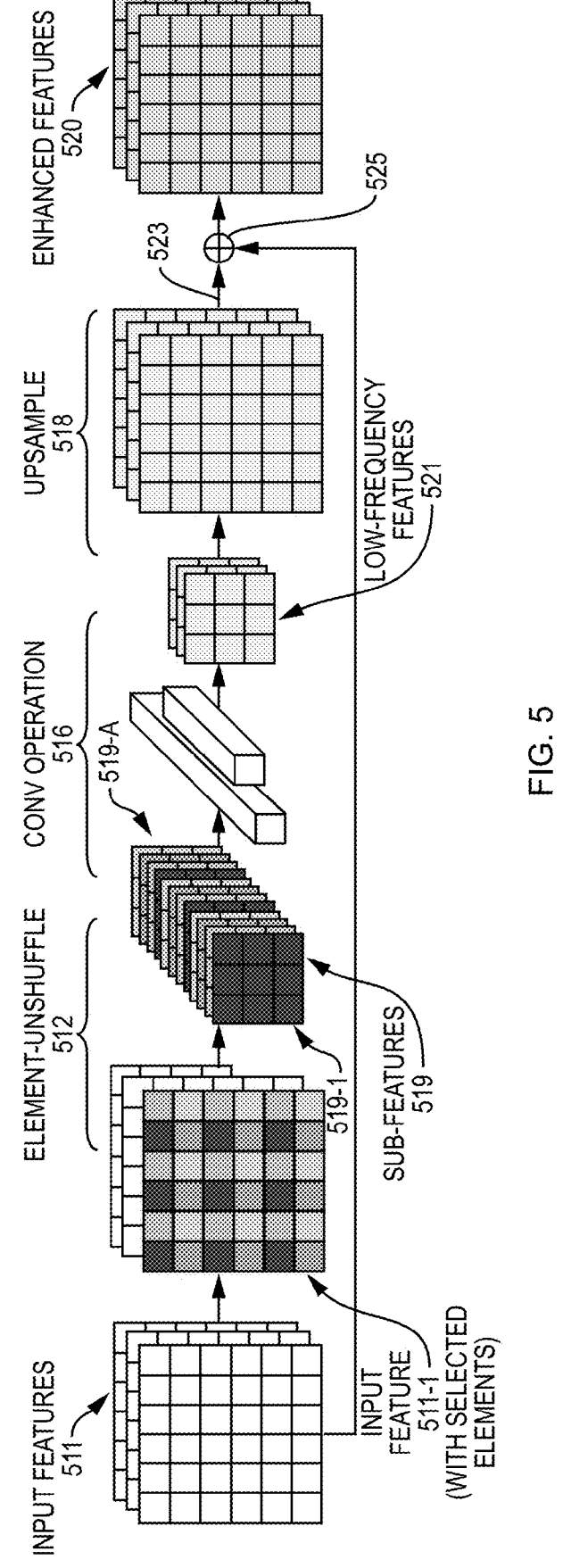
FIG. 5 is a block diagram of an example embodiment of an image SR module.

FIG. 5 is a block diagram of an example embodiment of an image SR module 514. With reference to FIG. 2 and FIG. 5, to perform the element-unshuffled downsampling, the element-unshuffled downsampler 212 may be further configured to perform an element-unshuffle operation 512. The element-unshuffle operation 512 may include downsampling input features 511. The input features 511 may include elements from a transformed version (not shown) of the LR representation 206. Such a transformed version may be produced via convolution, such as disclosed further below with regard to FIG. 8.

Continuing with reference to FIGS. 2 and 5, the downsampling may include reducing a size of the input features 511 by separating the input features 511 into sub-features 519. To separate the input features 511 into the sub-features 519, the element-unshuffled downsampler 212 may be further configured to select a subset of elements from an input feature 511-1 of the input features 511 and create a sub-feature (e.g., 519-1, . . . , or 519-$n$) of the sub-features 519 by grouping the subset of elements selected.

As such, the element-unshuffled downsampler 212 may be further configured to produce, via the element-unshuffled downsampling, a plurality of sub-features, namely the sub-features 519-1, . . . , and 519-$n$, from the input features 511. For non-limiting example, to perform the image SR, the image SR module (214, 514) may be further configured to perform a max-pooling operation (not shown) on the sub-features 519 to produce a plurality of pooled sub-features (not shown). The image SR module (214, 514) may be further configured to convolve, using group convolution, pooled sub-features of the plurality of pooled sub-features. Such convolving may be performed via the convolution operation 516. The convolving may output low-frequency features 521. The low-frequency features 521 may be at a lower frequency relative to a frequency of the input features 511. The image SR module (214, 514) may be further configured to upsample 518 the low-frequency features 521 output from the convolving to produce up-sampled low-frequency features 523. The image SR module (214, 514) may be further configured to produce enhanced features 520 by adding, via an adder 525, the up-sampled low-frequency features 523 to the input features 511. With reference to FIGS. 1, 2, and 5, the image SR module (214, 514) may be further configured to produce the reconstructed version 108 based on the enhanced features 520 produced.

3 Proposed Method—Example Embodiment

Figures 6A, 6B, 6C, 7A, 7B, 7C:
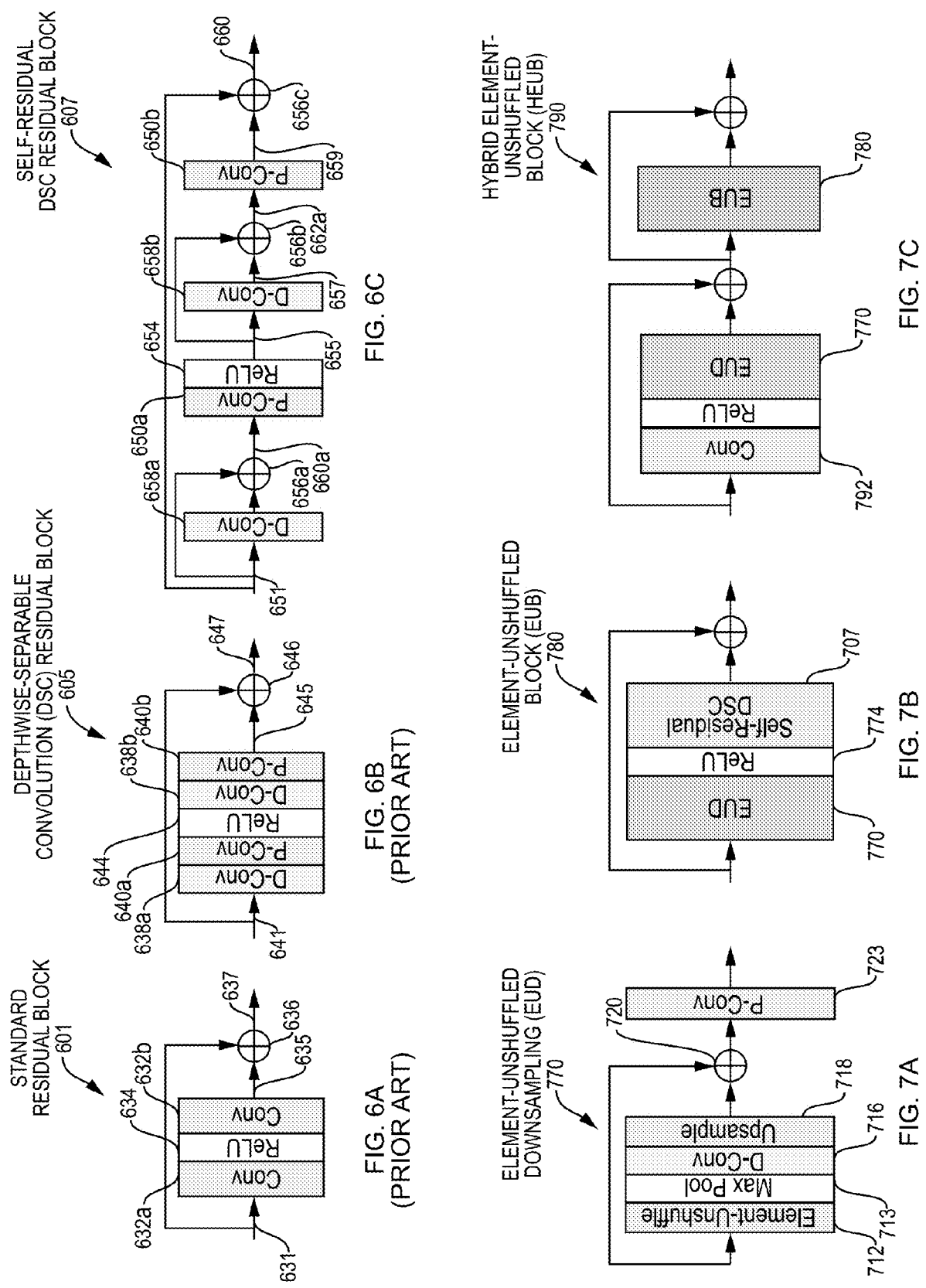
FIG. 6A is a block diagram of a standard residual block.
FIG. 6B is a block diagram of a depthwise separable convolution (DSC) residual block.
FIG. 6C is a block diagram of an example embodiment of Self-Residual DSC residual block.
FIG. 7A is a block diagram of an example embodiment of Element-Unshuffled Downsampling (EUD).
FIG. 7B is a block diagram of an example embodiment of an Element-Unshuffled Block (EUB).
FIG. 7C is a block diagram of an example embodiment of a Hybrid Element-Unshuffled Block (HEUB).

An example embodiment disclosed herein may include a lightweight structure called Hybrid Element-Unshuffled Block (HEUB) to replace the traditional Residual Convolution Block, which is shown in FIG. 6A.

FIG. 6A is a block diagram of a standard residual block 601. The standard residual block 601 includes a first convolution (Conv) layer 632 followed by a rectified linear activation unit (ReLU) layer 634, second Conv layer 632$a$, and an adder 636 configured to produce a residual block output 637 of the standard residual block 601 by adding an input 631, input to the first Conv Layer 632$a$, to an output 635 from the second Conv layer 632$b$.

FIG. 6B is a block diagram of a depthwise separable convolution (DSC) residual block 605 constructed by DSC. As such, the DSC residual block 605 includes a first depthwise convolution (D-Conv) layer 638$a$ followed by a first pointwise convolution (P-Conv) layer 640$a$, ReLU layer 644, second D-Conv layer 638$b$, second P-Conv layer 640B, and an adder 646 configured to produce a residual block output 647 of the DSC residual block 605 by adding an input 651, input to the first D-Conv layer 638$a$, to an output 645 from the second P-Conv layer 640$b$.

FIG. 6C is a block diagram of an example embodiment of a self-residual DSC residual block 607 that is based on an example embodiment of Self-Residual DSC disclosed herein. In contrast to conventional residual blocks, such as the standard residual block 601 and DSC residual block 605 of FIG. 6A and FIG. 6B, respectively, the Self-Residual DSC residual bock 607 includes a first D-Conv layer 658$a$ followed by a first adder 656$a$ configured to add an input 651 to the first D-Conv layer 658$a$ to produce a first sum 660$a$ that is input to a first P-Conv layer 650$a$. The first P-Conv layer 650$a$ is followed by a ReLU layer 654. A ReLU layer output 655 from the ReLU layer 654 is output to a second D-Conv layer 658$b$ and a second adder 656$b$. The second adder 656$b$ is configured to produce a second sum 662$a$ by adding the ReLU layer output 655 to a D-Conv output 657, output from the second D-Conv layer 658$b$. The second sum 662$a$ may be input to a second P-Conv layer 650$b$ and a third adder 656$c$ may be configured to produce a residual block output 660 of the residual block 607 by adding an output 659 from the second P-Conv layer 650$b$ to the input 651, input to the first D-Conv layer 658$a$.

An example embodiment of a proposed method disclosed herein may include three parts: a standard convolution layer, the proposed element-unshuffled downsampling, and the proposed EUB. The EUB may be an integration of the element-unshuffled downsampling and the Self-Residual DSC, disclosed above with regard to FIG. 6C. Therefore, this section is organized as follows: first, details of the Self-Residual DSC are introduced; the element-unshuffled downsampling will be introduced in the second sub-section; after which the details of the HEUN are presented.

3.1 Self-Residual DSC

DSC. Depthwise separable convolution (DSC) is composed by a depthwise layer and a pointwise layer as shown in FIG. 6B, disclosed above. The depthwise layer uses a single kernel for each input feature map. DSC is a popular lightweight module to reduce the redundant operations in the standard convolution. The conversion from the standard convolution to the DSC can be described as:

$$F^{out} = C(F^{in}) \approx P(D(F^{in})),\qquad(1)$$

where $F^{out}$ means the output features, C represents the standard convolution, $F^{in}$ means the input features, D means the depthwise convolution, and P means the pointwise convolution. Depthwise convolution is the major part to process the spatial information of the input features, which needs far fewer parameters and computation costs than the standard convolution.

Self-Residual DSC. Self-Residual DSC may have a significant side effect on the performance of SISR since SISR needs to enrich the information. The side effect is disclosed further below in Section 4.2. To overcome the defects brought by the depthwise layer and to keep its ability to process the spatial information, an example embodiment includes a balanced trade-off design by simply adding the input before the depthwise layer to the output of the depthwise layer as shown in FIG. 6C, disclosed above. The whole structure is described as:

$$F^{out} = P(D(F^{in}) + F^{in}).\qquad(2)$$

Comparing Equation (1) and Equation (2), one can easily figure out that the outputs of the Self-Residual DSC have more similarity to the inputs than the outputs of the DSC. An analysis of the importance of the similarity is provided in Section 4.2, further below. The self-residual does not introduce any additional parameters. Further, the additional computation costs of the addition operation can be ignored.

3.2 Element-Unshuffled Downsampling

Details regarding the element-unshuffled downsampling (EUD), which is shown in FIG. 7A, are disclosed in this section.

FIG. 7A is a block diagram of an example embodiment of Element-Unshuffled Downsampling (EUD) 770.

FIG. 7B is a block diagram of an example embodiment of an Element-Unshuffled Block (EUB) 780.

FIG. 7C is a block diagram of an example embodiment of a Hybrid Element-Unshuffled Block (HEUB) 790. It should be noted that a group number of the depthwise convolution 716 in the EUD 770 is equal to the number of its inputs.

As disclosed in previous sections, low-frequency features can enhance the high-level representations (Ke Sun, et al., "Deep high-resolution representation learning for human pose estimation," In CVPR, 2019, Jingdong Wang, et al., "Deep high-resolution representation learning for visual recognition," IEEE transactions on pattern analysis and machine intelligence, 43(10):3349-3364, 2020). In the work (Jingdong Wang, et al., "Deep high-resolution representation learning for visual recognition," IEEE transactions on pattern analysis and machine intelligence, 43(10):3349-3364, 2020), it is explored that repeating multi-resolution fusions can boost the high-resolution representations with the help of the low-resolution representations in image segmentation tasks. However, previous SR works (Muhammad Haris, et al., "Deep back-projection networks for super-resolution," In CVPR, 2018, Zhen Li, et al., "Feedback network for image super-resolution," In CVPR, 2019) took a lot of effort to use the low-frequency features in SISR with a heavy recurrent method. An example embodiment disclosed herein provides a more efficient way to utilize the low-frequency features with single forward inference for the SISR task. The proposed method is shown in FIG. 5, disclosed above, and in further detail below.

With reference to FIG. 5, an example embodiment of an element-unshuffled downsampler is disclosed. Note that the notation of the Conv Operation 516 in FIG. 5 is a general operation. Disclosure with regard to the best operations is provided in the following sections. In this subsection, the element-unshuffle 512 operation is introduced. The focus then turns to exploring the most effective operations after the element-unshuffle 512 operation.

Element-unshuffle. The element-unshuffle 512 operation is a reverse (inverse) operation of pixel-shuffle (Wenzhe Shi, et al., "Real-time single image and video super-resolution using an efficient sub-pixel convolutional neural network," In CVPR, 2016). As shown in FIG. 5, it divides (separates) a feature, such as the feature 517, into several sub-features 519, whose number in FIG. 5 is four for non-limiting example. Four different colors/patterns are used to represent the different selections of sub-features 519 in FIG. 5. As shown in the FIG. 5, the sub-features 519 contain the complete information of the original features, that is, the input features 511, but with lower resolution. Therefore, such sub-features 519 may be used to avoid information loss while reducing the size of the features, namely the input features 511.

Element-Unshuffled Downsampling. With reference to FIG. 5 and FIG. 7A, after the element-unshuffle (512, 712) operation, an efficient and effective structure may be used to process the low-resolution features. As shown in FIG. 7A, a max-pooling layer 713 may be employed after the element-unshuffle (512, 712). As such, a powerful non-linear operation is employed before the convolution 516 operation to extract better local features. Therefore, the max-pooling layer 713 is chosen instead of the average-pooling layer. The process may be described as:

$$F^{out}=M(F^{in}),i\in\{1,2,3,4\},j\in\{1\ldots n\}, \tag{3}$$

After the non-linear operation, a group convolution, namely the D-Conv 716 layer, may be employed to reduce the channel of the input, which is actually a downsampling operation. The process can be described as:

$$F^{out}=G(F^{in},F^{in},F^{in},F^{in}),j\varepsilon\{1\ldots n\}, \tag{4}$$

To enhance the feature, an upsampler 718 may perform the upsample 518 operation that may be used to project the low-frequency features to high dimension, and an adder (520, 720) may be employed to add them to the original input features 511. After that, a pointwise convolution 723 may be utilized for the communication among the channels. The process can be described as:

$$F^{out}=P(U(F^{in})+L), \tag{5}$$

where U stands for the upsampling function, $F^{in}$ means the input channels to the upsampler 718, and L means the original input features 511. An example embodiment may use a bi-linear upsampler. Experiments with regard to same are described in Section 4.2 further below.

3.3 Hybrid Element-Unshuffled Network

Element-Unshuffled Block. After the exploration of the Self-Residual DSC and the element-unshuffled downsampling, the lightweight Element-Unshuffled Block (EUB) 780 of FIG. 7B is introduced. The EUB 780 is composed of the Self-Residual DSC 707, disclosed above with regard to the Self-Residual DSC 607 of FIG. 6C, and the element-unshuffled downsampling 770 of FIG. 7A. The details of the EUB 780 are shown in FIG. 7B. The block can be represented as.

$$F^{out}=P(D(\sigma(EUD(F^{in})))+\sigma(EUD(F^{in})))+F^{in}, \tag{6}$$

where the EUD denotes the whole procedure of the element-unshuffled downsampling, and σ represents the ReLU (Xavier Glorot, et al., "Deep sparse rectifier neural networks," In AISTATS, 2011) included as the ReLU 774 in the EUB 780.

Hybrid Element-Unshuffled Block. To further improve the performance, an example embodiment integrates the standard convolution into the proposed EUB 780, and a result of such integration may be referred to herein as a Hybrid Element-Unshuffled Block (HEUB). An example embodiment of HEUB 790 is shown in FIG. 7C. The kernel size of the standard convolution layer 792 is set to 3 for non-limiting example for the trade-off between the performance and the efficiency. The kernel setting of the rest modules is the same as for the EUB 780, which will be demonstrated in Section 4.2, disclosed further below.

Hybrid Element-Unshuffled Network. The HEUB 790 may be used to construct an example embodiment of a Hybrid Element-Unshuffled Network (HEUN). The network is similar to EDSR (Bee Lim, Sanghyun Son, Heewon Kim, Seungjun Nah, and Kyoung Mu Lee. Enhanced deep residual networks for single image super-resolution. In CVPRW, 2017). Since one HEUB has two residual blocks, an example embodiment may, for non-limiting example, construct the body parts with 8 HEUB to align the settings in EDSR. To further reduce the parameters, an example embodiment may use the tail of IMIDN (Zheng Hui, Xinbo Gao, Yunchu Yang, and Xiumei Wang. Lightweight image super-resolution with information multi-distillation network. In ACMMM, 2019). An example embodiment of the architecture is shown in FIG. 8, disclosed below.

Figure 8:
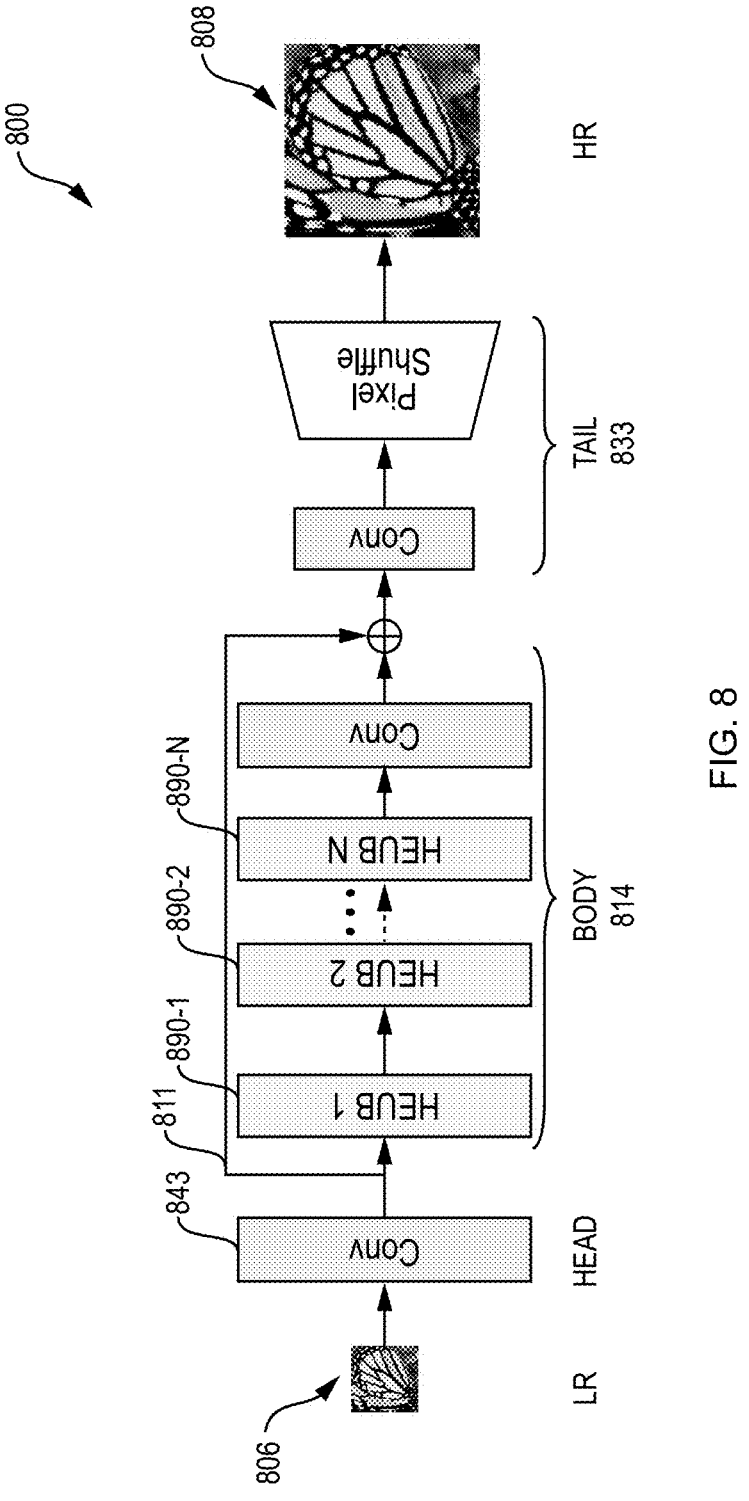
FIG. 8 is a block diagram of an example embodiment of a Hybrid Element-Unshuffled Network (HEUN) architecture.

FIG. 8 is a block diagram of an example embodiment of a Hybrid Element-Unshuffled Network (HEUN) architecture 800. The HEUN architecture 800 may be used to produce a reconstructed version 808 of a high-resolution (HR) original image (not shown) from a low-resolution (LR) representation 806 of the original image. The HEUN architecture 800 is based on EDSR (Bee Lim, Sanghyun Son, Heewon Kim, Seungjun Nah, and Kyoung Mu Lee. Enhanced deep residual networks for single image super-resolution. In CVPRW, 2017), and the tail 833 is from IMDN (Zheng Hui, Xinbo Gao, Yunchu Yang, and Xiumei Wang. Lightweight image super-resolution with information multi-distillation network. In ACMMM, 2019). The LR representation 806 may be transformed via convolution 843 to produce input features 811 from the transformed version. In the body 815 of the HEUN architecture 800, a total number of HEUBs (890-1, 890-2, . . . , 890-N) in the HEUN architecture 800 is no less than 8. The total number of HEUBs may be controlled for different sizes of the model. For example, HEUN-Medium (HEUN-M) has 8 HEUBs in total, and HEUN-Large (HEUN-L) has 12 HEUBs. The total number of HEUBs in HEUN-Small (HEUN-S) is 8, however, one HEUB is replaced with two EUBs. The upsampler for the final high-resolution output is the pixel-shuffle module (Wenzhe Shi, et al., "Real-time single image and video super-resolution using an efficient sub-pixel convolutional neural network," In CVPR, 2016).

4 Experimental Results

4.1 Settings

Datasets and Metrics. Following (Song Han, et al., "Learning both weights and connections for efficient neural network," In NeurIPS, 2015, Radu Timofte, et al., "Ntire 2017 challenge on single image super-resolution: Methods and results," In CVPRW, 2017, Bee Lim, et al., "Enhanced deep residual networks for single image super-resolution. In CVPRW, 2017, Kai Zhang, Wangmeng Zuo, and Lei Zhang. "Learning a single convolutional super resolution network for multiple degradations." In CVPR, 2018), the dataset DIV2K (Radu Timofte, et al., "Ntire 2017 challenge on single image super-resolution: Methods and results," In CVPRW, 2017) and Flickr2K (Bee Lim, et al., "Enhanced deep residual networks for single image super-resolution. In CVPRW, 2017) was used as training data. Five standard benchmark datasets were used for testing: Set5 (Marco Bevilacqua, et al., "Low-complexity single-image super-resolution based on nonnegative neighbor embedding," In BMVC, 2012), Set14 (Roman Zeyde, et al., "On single image scale-up using sparse-representations," In Proc. 7th Int. Conf. Curves Surf., 2010), B100 (David Martin, et al. "A database of human segmented natural images and its application to evaluating segmentation algorithms and measuring ecological statistics," In ICCV, 2001), Urban100 (Jia-Bin Huang, et al., "Single image super-resolution from transformed self-exemplars," In CVPR, 2015), and Manga109 (Yusuke Matsui, et al., "Sketch-based manga retrieval using manga109 dataset," Multimedia Tools and Applications, 2017). The SR results are evaluated with PSNR and SSIM (Zhou Wang, et al., "Image quality assessment: from error visibility to structural similarity," TIP, 2004) on Y channel (i.e. luminance) of transformed YCbCr space. Following the work (Kai Zhang, Wangmeng Zuo, and Lei Zhang. "Learning a single convolutional super resolution network for multiple degradations." In CVPR, 2018, Yulun Zhang, et al., "Residual non-local attention networks for image restoration,". In ICLR, 2019), the degradation is bicubic downsampling by adopting the MATLAB® function imresize with the option bicubic (denote as BI for short). The BI model was used to simulate LR images with scaling factor 2, 3, and 4. In addition, a comparison of the parameters and Multi-Adds was made to evaluate the spatial and time complexity.

Training Setting. Following settings of (Bee Lim, et al., "Enhanced deep residual networks for single image super-resolution. In CVPRW, 2017), in each training batch, 16 LR RGB patches were randomly extracted with the size of 48×48 as inputs. The patches were randomly augmented by flipping horizontally or vertically and rotating 90°. There are 14,200 iterations in one epoch. An example embodiment of HEUN was implemented with the PyTorch (Adam Paszke, et al., "Pytorch: An imperative style, high-performance deep learning library," In NeurIPS, 2019) and updated with Adam optimizer (Adam Paszke, et al., "Pytorch: An imperative style, high-performance deep learning library," In NeurIPS, 2019). The learning rate was initialized to $2 \times 10\text{-}4$ for all layers and follows the cosine scheduler with 250 epochs in each cycle. Some experiments used the step scheduler and will be emphasized in the caption for fair comparison.

4.2 Ablation Study

The effectiveness of the Self-Residual DSC is demonstrated first. Then, the enhancement of the element-unshuffled downsampling is shown. A set of experiments are implemented to figure out the best operation in the element-unshuffled downsampling. Further, the best setting of the kernel size in the EUB is explored. At last, the features are visualized and intuition disclosed.

TABLE 1

Experiment results of different components in DSC generated with step schedule. Conv represents standard convolution.

| Methods | PSNR (Set5) | Params | Multi-Adds |
|---|---|---|---|
| Conv Res-Block | 38.05 | 1343K | 309.9 G |
| Conv + DSC | 37.88 | 701K | 163.6 G |
| Conv + P-Conv | 37.90 | 690K | 161.5 G |
| Conv + Self-Residual DSC | 37.91 | 701K | 163.6 G |
| DSC only | 37.65 | 207K | 44.9 G |
| P-Conv only | 37.36 | 181K | 40.7 G |
| Self-Residual DSC only | 37.73 | 207K | 44.9 G |

Effectiveness of the Self-Residual DSC. From Table 1, disclosed above, it can be observed that the combination of standard convolution and DSC gets worse PSNR than the combination of standard convolution and the pointwise convolution. Therefore, a conclusion can be drawn that the depthwise convolution will obstruct the accuracy of the image reconstruction in the DSC. However, the depthwise convolution may not be abandoned for a design of the lightweight network without standard convolution. The results presented in Table 1 and FIG. 9, disclosed below, show that an example embodiment of Self-Residual DSC disclosed herein can overcome the defects of the depthwise convolution with a simple residual with barely no additional computation costs and parameters.

Figure 9:
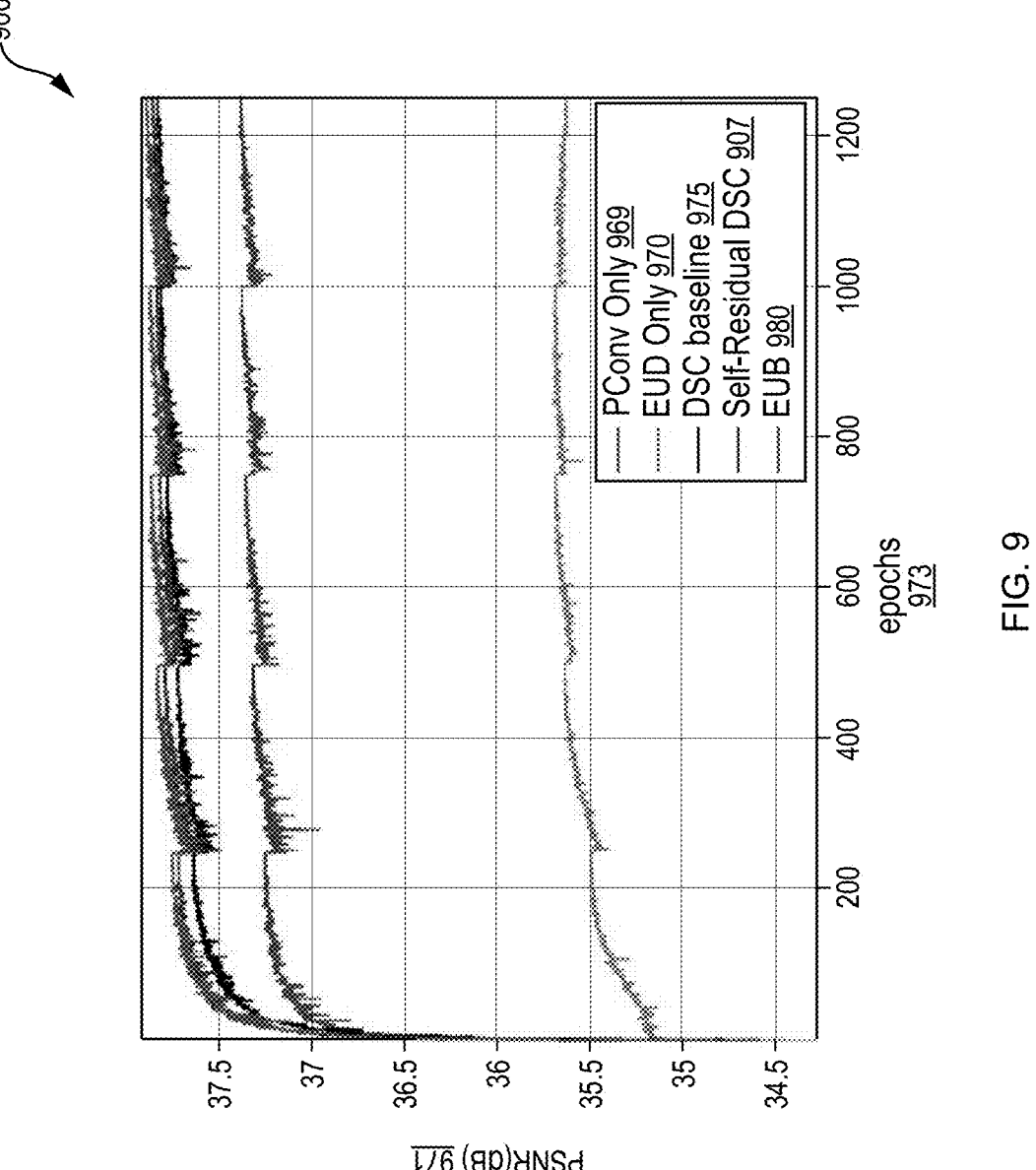
FIG. 9 is a graph with an exemplification of a comparison among networks.

FIG. 9 is a graph 900 with an exemplification of a comparison among networks. The graph includes plots of PSNR 971 vs. epochs 973. The comparison is among the networks constructed by pointwise convolution 969, element-unshuffled downsampling (EUD) 970, baseline DSC 975, the Self-Residual DSC 907, and the element-unshuffled block (EUB) 980.

Effectiveness of the element-unshuffled downsampling. Six experiments were run to find the best combination of the pooling layer and the upsampler. The results are shown in Table 2, disclosed below.

TABLE 2

The experiment results of different combination of pooling layers and upsamplers. The results are generated with cosine scheduler on Set5 with ×2 scale.

| | | | | | | | |
|---|---|---|---|---|---|---|---|
| Nearest | X | ✓ | ✓ | X | ✓ | X | X |
| Bi-linear | ✓ | X | X | ✓ | X | ✓ | ✓ |
| Max-pooling | X | X | ✓ | ✓ | X | X | X |
| Avg-pooling | ✓ | ✓ | X | X | X | X | ✓ |
| PSNR | 37.83 | 37.82 | 37.85 | 37.87 | 37.82 | 37.83 | 37.83 |

From Table 2, disclosed above, it can be observed that the model with max-pooling layer and bi-linear upsampling can achieve the best performance among all combinations. The performance of the element-unshuffled downsampling with other kinds of downsampling operations was also compared. The results are shown in FIG. 10A.

Figure 10A:
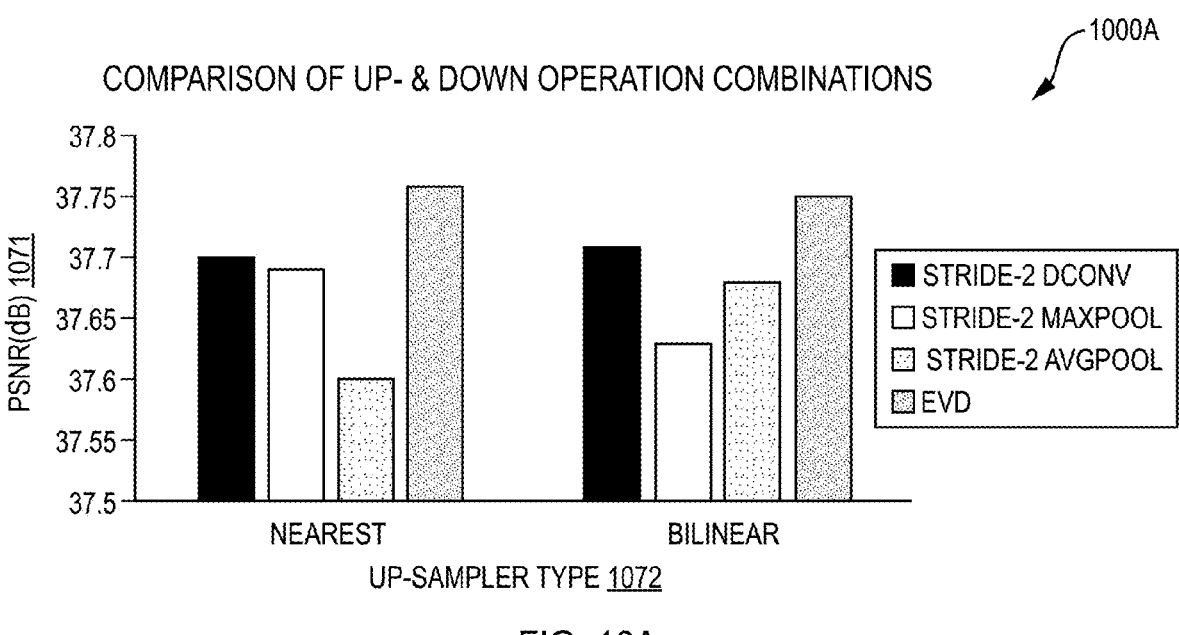
FIG. 10A is a bar chart of an exemplification of a comparison of different combinations of up- and down-scale operations.

FIG. 10A is a bar chart 1000A of an exemplification of a comparison of different combinations of up- and down-scale operations. The bar chart 1000A includes PSNR 1071 values per up-sampler type 1072. The results are from an ablation study of different combinations of up- and down-scale operations. The results were conducted with a step scheduler and should not be compared with other experiments disclosed herein.

Figure 10B:
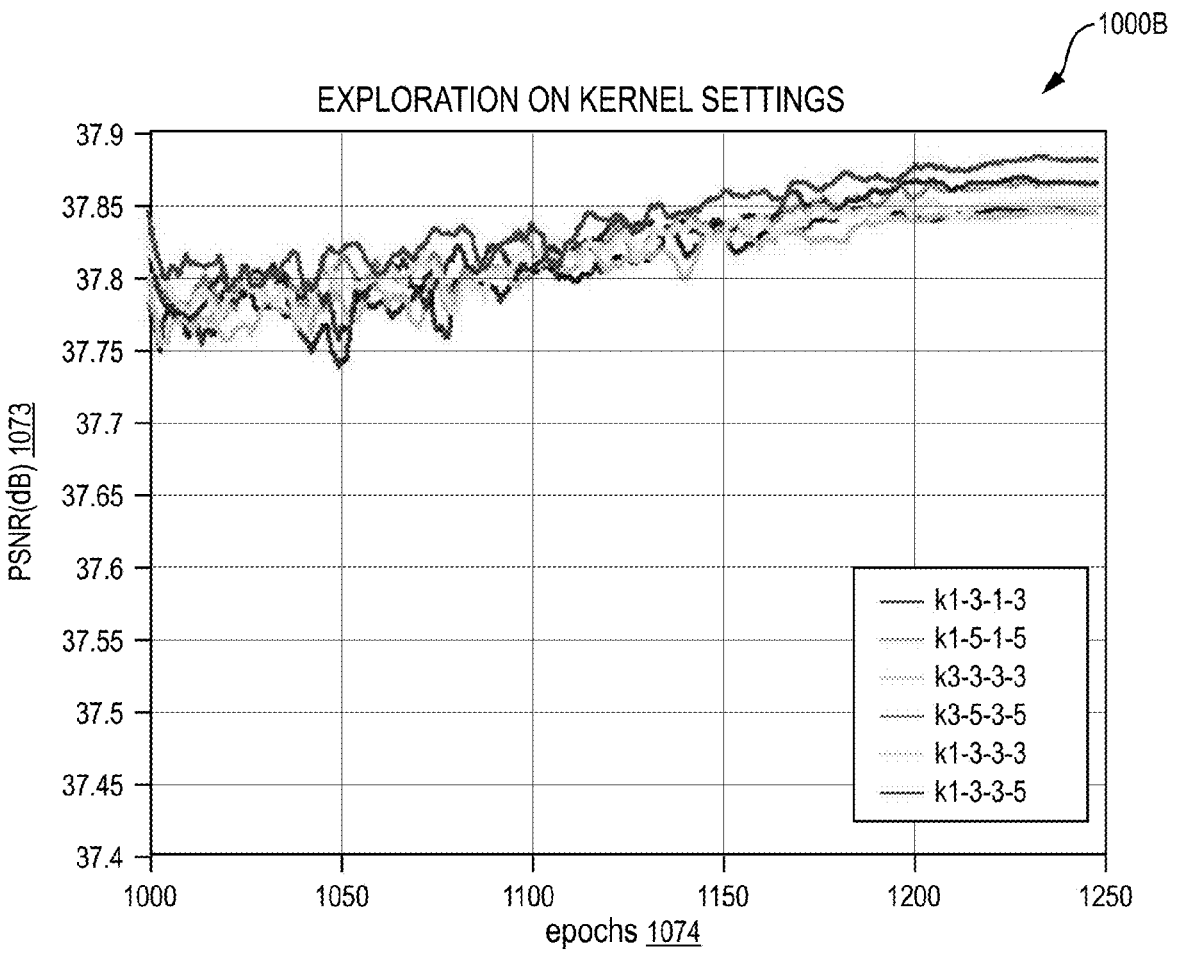
FIG. 10B is a graph of an exemplification of results for different kernel settings.

FIG. 10B is a graph 1000B of an exemplification of results for different kernel settings. Different settings on kernels of depthwise layer were employed in the EUB. The PSNR 1073 was calculated on Set5 with ×2 scale. The graph 1000B compares PSNR 1073 over epochs 1074 for the EUD module, depthwise convolution with 2 strides, max pooling, and average pooling, with both bi-linear and nearest upsampling. As shown in FIG. 10B, the element-unshuffled downsampling is far beyond others.

Further, a network was constructed with only element-unshuffled downsampling and its performance compared with the networks constructed by the baseline DSC, the Self-Residual DSC, and the EUB. The results are shown in FIG. 9, disclosed above. The network constructed with only element-unshuffled downsampling performs far worse than the baseline DSC. However, the network of EUB can perform better than the Self-Residual DSC. Specifically, the network constructed by EUB achieves 0.04 dB higher than the Self-Residual DSC only. The results show that the element-unshuffled downsampling can enhance the performance in combination with other spatial operations.

Ablation Study of the EUB. Some experiments were run to explore the impact brought by different settings of kernels. The results are shown in FIG. 10B, disclosed above. The performance was compared among the settings 1-3-1-3, 1-5-1-5, 3-3-3-3, 3-5-3-5, 1-3-3-3, and 1-3-3-5. From the FIG. 10B, it can be observed that the setting 1-3-3-5 performs superior to all other settings. Therefore, an example embodiment may use 1-3-3-5 as the kernel settings of the EUB.

Intuition. For the further exploration, heatmap features were generated using the Normalized Mean Error (NME) among their head features and body features. The NME can be described as $NME = 1/N \| F^H - F^B \|_F$, where N means the total number of the elements in the features, $F^H$ means the output features from the head block, $F^B$ means the output features from the body block, and $\|\cdot\|_F$ denotes the Frobenius norm. The relationship was plotted between the PSNR and NME for the network constructed with pointwise convolutions, the network with DSC, the network with Self-Residual DSC, the network with element-unshuffled downsampling, HEUN-S, HEUN-M, and HEUN-L. The results are presented in FIGS. 11A-F, disclosed below. Also shown is the result of single image besides the mean results.

FIGS. 11A-F are charts (1100A-F) with exemplifications of a relationship between PSNR 1181 and the NME 1183. The chart 1100A of FIG. 11A was generated on the whole Set5 dataset with ×2 scale. The results of FIGS. 11B-F were generated for the image of a baby, butterfly, bird, head, and woman in the Set5, as shown in the charts 100B, 1100C, 1100D, 1100E, and 1100F, respectively.

From FIGS. 11A-F, it can be observed that the NME of the pointwise structured network is much lower than the DSC baseline network, which means the main change of the features is brought by the depthwise convolution. The PSNR results of the pointwise structured network and element-unshuffled downsampler structured network show that limited changes will decrease the performance. However, the DSC network has large NME but limited PSNR, which means the larger NME does not represent the better performance. Although the chart generated from the bird, namely the chart 1100D of FIG. 11D, indicates that there exists some variance, the conclusion still stands. Also visualized is the NME result among the head features and body features of these networks, respectively. The visualization results are shown in FIGS. 12A-1 through 12E-8, disclosed below.

FIG. 12A-1 is an exemplification of an image 1200A-1 of a baby.

FIGS. 12A-2 through 12A-8 are exemplifications of NME visualizations for the image 1200A-1 of FIG. 12A-1. FIGS. 12A-2 through 12A-8 are exemplifications of the NME visualizations of Pointwise Convolution, DSC, Self-Residual DSC (SRDSC), element-unshuffled downsampling, HEUN-S, HEUN-M, and HEUN-L, respectively. The brighter color means a higher NME value. The features are binarized for better visualization.

FIG. 12B-1 is an exemplification of an image 1200B-1 of a butterfly.

FIGS. 12B-2 through 12B-8 are exemplifications of NME visualizations for the image 1200B-1 of FIG. 12B-1. FIGS. 12B-2 through 12B-8 are exemplifications of the NME visualizations of Pointwise Convolution, DSC, SRDSC, element-unshuffled downsampling, HEUN-S, HEUN-M, and HEUN-L, respectively. The brighter color means a higher NME value. The features are binarized for better visualization.

FIG. 12C-1 is an exemplification of an image 1200C-1 of a bird.

FIGS. 12C-2 through 12C-8 are exemplifications of NME visualizations for the image 1200C-1 of FIG. 12C-1. FIGS. 12C-2 through 12C-8 are exemplifications of the NME visualizations of Pointwise Convolution, DSC, SRDSC, element-unshuffled downsampling, HEUN-S, HEUN-M, and HEUN-L, respectively. The brighter color means a higher NME value. The features are binarized for better visualization.

FIG. 12D-1 is an exemplification of an image 1200D-1 of a head.

FIGS. 12D-2 through 12D-8 are exemplifications of NME visualizations for the image 1200D-1 of FIG. 12D-1. FIGS. 12D-2 through 12D-8 are exemplifications of the NME visualizations of Pointwise Convolution, DSC, SRDSC, element-unshuffled downsampling, HEUN-S, HEUN-M, and HEUN-L, respectively. The brighter color means a higher NME value. The features are binarized for better visualization.

FIG. 12E-1 is an exemplification of an image 1200E-1 of a woman.

FIGS. 12E-2 through 12E-8 are exemplifications of NME visualizations for the image 1200E-1 of FIG. 12E-1. FIGS. 12E-2 through 12E-8 are exemplifications of the NME visualizations of Pointwise Convolution, DSC, SRDSC, element-unshuffled downsampling, HEUN-S, HEUN-M, and HEUN-L, respectively. The brighter color means a higher NME value. The features are binarized for better visualization.

Thus, it can be concluded that the EUD can significantly reduce the NME among the shallow features and deep features. Adjusting the number of the modules will improve the performance of the architecture. Further, it can be observed that the NME among the head and body features gets smaller with an integration of the standard convolution into the EUB, comparing the heatmap features of HEUN-S and HEUN-M. Considering the NME of the pointwise structured network, it is natural to think about the communication among the features can also help to learn the similarity among the features.

From the scatter figure of mean results, it was noticed that the performance increases explosively with the increase of the NME at first. Then the performance starts to drop after the NME surpasses the value around 0.007. Further, the NME gets smaller by increasing the number of element-unshuffled downsamplers. Therefore, it can be concluded that there may exist an optimal NME value, and increasing element-unshuffled downsamplers or adding residuals will reduce the NME of the network towards the optimal. Such intuition can help in a design of the network structure or in applying the pruning strategy on SISR. However, it was also noticed that the optimal NME is variable with the inputs. More experiments are needed to validate the conclusion for different tail structures and datasets in the future.

4.3 Comparison Results

Simulating a LR image with a BI degradation model is widely used in image SR settings. For the BI degradation model, an example embodiment of a HEUN network was compared with 12 state-of-the-art SR methods: SRCNN (Chao Dong, et al., "Image super-resolution using deep convolutional networks," TPAMI, 2016), VDSR (Jiwon Kim, et al., "Accurate image super-resolution using very deep convolutional networks," In CVPR, 2016), DRCN (Jiwon Kim, et al., "Deeply-recursive convolutional network for image super-resolution," In CVPR, 2016), DRRN (Ying Tai, et al., "Image super-resolution via deep recursive residual network," In CVPR, 2017), LapSRN (Wei-Sheng Lai, et al., "Deep laplacian pyramid networks for fast and accurate super-resolution," In CVPR, 2017), MemNet (Ying Tai, et al., "Memnet: A persistent memory network for image restoration," In ICCV, 2017), CARN (Namhyuk Ahn, et al., "Fast, accurate, and lightweight super-resolution with cascading residual network," In ECCV, 2018), IDN (Zheng Hui, et al., "Fast and accurate single image super-resolution via information distillation network,". In CVPR, 2018), SRFBN-S (Zhen Li, et al., "Feedback network for image super-resolution," In CVPR, 2019), IMDN (Zheng Hui, et al., "Lightweight image super-resolution with information multi-distillation network," In ACMMM, 2019), LatticeNet (Xiaotong Luo, et al., "Latticenet: Towards lightweight image super-resolution with lattice block," In ECCV, 2020), and SMSR (Longguang Wang, et al., "Exploring sparsity in image super-resolution for efficient inference," In CVPR, 2021). All of them are popular lightweight SR methods.

Visualization Results. Visualization results are shown in FIGS. 13A-2 through 13A-11, FIGS. 13B-2 through 13B-11, FIGS. 13C-2 through 13C-11, and FIGS. 13D-2 through 13D-11. Such visualization results provide a visual comparison with lightweight SR networks on the Urban100 and Manga109 datasets, as disclosed below. The results are generated with a ×4 scale on the Urban100 and Manga109 datasets.

FIG. 13A-1 is an exemplification of an image 1300A-1, namely the img.044 image from the Urban100 dataset, with a ×4 scale.

FIGS. 13A-2 through 13A-11 are exemplifications of visualization results for the image 1300A-1 of FIG. 13A-1 with different SR methods. Specifically, FIG. 13A-2 is an exemplification of a visualization result, namely the HQ 1300A-2 image, that is based on HQ while FIGS. 13A-3, 13A-4, 13A-5, 13A-6, 13A-7, 13A-8, 13A-9, 13A-10, and 13A-11 are exemplifications of visualization results, namely the Bicubic 1300A-3 image, SRCNN 1300A-4 image, VDSR 1300A-5 image, LapSRN 1300A-6 image, MemNet 1300A-7 image, CARN 1300A-8 image, IMDN 1300A-9 image, SMSR 1300A-10 image, and HEUN-L 1300A-11 image, that are based on Bicubic, SRCNN, VDSR, LapSRN, MemNet, CARN, IMDN, SMSR, and HEUN-L, respectively.

FIG. 13B-1 is an exemplification of an image 1300B-1, namely the img.089 image from the Urban100 dataset, with a ×4 scale.

FIGS. 13B-2 through 13B-11 are exemplifications of visualization results for the image 1300B-1 of FIG. 13B-1 with different SR methods. Specifically, FIG. 13B-2 is an exemplification of a visualization result, namely the HQ 1300B-2 image, that is based on HQ while FIGS. 13B-3, 13B-4, 13B-5, 13B-6, 13B-7, 13B-8, 13B-9, 13B-10, and 13B-11 are exemplifications of visualization results, namely the Bicubic 1300B-3 image, SRCNN 1300B-4 image, VDSR 1300B-5 image, LapSRN 1300B-6 image, MemNet 1300B-7 image, CARN 1300B-8 image, IMDN 1300B-9 image, SMSR 1300B-10 image, and HEUN-L 1300B-11 image, that are based on Bicubic, SRCNN, VDSR, LapSRN, MemNet, CARN, IMDN, SMSR, and HEUN-L, respectively.

FIG. 13C-1 is an exemplification of an image 1300C-1, namely the img.092 image from the Urban100 dataset, with a ×4 scale.

FIGS. 13C-2 through 13C-11 are exemplifications of visualization results for the image 1300C-1 of FIG. 13C-1 with different SR methods. Specifically, FIG. 13C-2 is an exemplification of a visualization result, namely the HQ 1300C-2 image, that is based on HQ while FIGS. 13C-3, 13C-4, 13C-5, 13C-6, 13C-7, 13C-8, 13C-9, 13C-10, and 13C-11 are exemplifications of visualization results, namely the Bicubic 1300C-3 image, SRCNN 1300C-4 image, VDSR 1300C-5 image, LapSRN 1300C-6 image, MemNet 1300C-7 image, CARN 1300C-8 image, IMDN 1300C-9 image, SMSR 1300C-10 image, and HEUN-L 1300C-11 image, that are based on Bicubic, SRCNN, VDSR, LapSRN, MemNet, CARN, IMDN, SMSR, and HEUN-L, respectively.

FIG. 13D-1 is an exemplification of an image 1300D-1, namely the YumeiroCook. image from the Manga109 dataset, with a ×4 scale.

FIGS. 13D-2 through 13D-11 are exemplifications of visualization results for the image 1300D-1 of FIG. 13D-1 with different SR methods. Specifically, FIG. 13D-2 is an exemplification of a visualization result, namely the HQ 1300D-2 image, that is based on HQ while FIGS. 13D-3, 13D-4, 13D-5, 13D-6, 13D-7, 13D-8, 13D-9, 13D-10, and 13D-11 are exemplifications of visualization results, namely the Bicubic 1300D-3 image, SRCNN 1300D-4 image, VDSR 1300D-5 image, LapSRN 1300D-6 image, MemNet 1300D-7 image, CARN 1300D-8 image, IMDN 1300D-9 image, SMSR 1300D-10 image, and HEUN-L 1300D-11 image, that are based on Bicubic, SRCNN, VDSR, LapSRN, MemNet, CARN, IMDN, SMSR, and HEUN-L, respectively.

As should be appreciated from the visualization results, compared with other methods, an example embodiment of a HEUN-L network disclosed herein generates better reconstruction results, especially on Manga109. An example embodiment of a HEUN-L network has fewer artifacts than other methods.

Quantitative Results. Quantitative results are shown in Table 3 of FIGS. 14A and 14B, disclosed below, for ×2, ×3, and ×4 SR.

FIGS. 14A-B are a table, namely Table 3, with an exemplification of Benchmark results for different methods 1401 with the BI degradation model. Table 3 shows average PSNR and structural similarity index (SSIM) values for a scaling factor 1403 of ×2, ×3, and ×4. In Table 3, the top-2 least parameters (params) of the parameters 1405, Multi-Adds 1407, and performance on each of the datasets, namely the Set5 1409, Set14 1411, B100 1413, Urban100 1415, and Manga100 1417 datasets, are highlighted with bold (e.g., in red) (best) and underlined (e.g., in blue) (second best), respectively. In Table 3, the "+" symbol denotes the results are generated with self-ensemble.

As shown in Table 3, among all methods, an example embodiment of HEUN-L achieves the new SOTA performance on every dataset with the scale of ×3 and ×4. When the scale is ×2, an example embodiment of an HEUN-L network still achieves the best performance on Set14, B100, and Manga109. Its PSNR on Urban100 is a little lower than LatticeNet, but its SSIM is higher. Although HEUN-L cannot catch up with the LatticeNet (Xiaotong Luo, et al., "Latticenet: Towards lightweight image super-resolution with lattice block," In ECCV, 2020), on the Set5 dataset with the scale of ×2, its computation costs and parameters are smaller. The results of HEUN-L+ show that performance can be further improved with a self-ensemble technique.

An example embodiment of the HEUN-M network can achieve top-3 performance on Set14 and B100 for each scale. Further, compared with other competitive methods, such as IMDN (Zheng Hui, et al., "Lightweight image super-resolution with information multi-distillation network," In ACMMM, 2019), LatticeNet (Xiaotong Luo, et al., "Latticenet: Towards lightweight image super-resolution with lattice block," In ECCV, 2020), and SMSR (Longguang Wang, et al., "Exploring sparsity in image super-resolution for efficient inference," In CVPR, 2021), it only has two thirds or even fewer parameters and Multi-Adds. Moreover, it can achieve top-5 performance on each dataset with any scale. Furthermore, the HEUN-M network can be significantly improved using the self-ensemble technique. An example embodiment of HEUN-S achieves comparable performance with the second least parameters among all the methods. When the scale is set to ×3 and ×4, it takes the minor computation costs among all the methods.

An example embodiment of the HEUN-S network was compared with the SRFBN-S (Zhen Li, et al., "Feedback network for image super-resolution," In CVPR, 2019) and CARN (Namhyuk Ahn, et al., "Fast, accurate, and lightweight super-resolution with cascading residual network," In ECCV, 2018), since SRFBN-S also uses the low-frequency features to enhance the inference features and CARN implements group convolutions for the lightweight purpose as well. As shown in the table, an example embodiment of the HEUN-S network can achieve around 0.08 dB than SRFBN-S on the PSNR of Set5 on average. In the meanwhile, the parameters and Multi-Adds of the HEUN-S network are 64.4% and 4.2%, respectively. The comparisons show that an example embodiment of the proposed module can significantly improve the SR performance using low-resolution features without any complicated operations. Compared with CARN, an example embodiment of a model disclosed herein achieves better PSNR when the scale is ×2 and ×3 with 14.8% and 17.9% of its size and Multi-Adds.

Inference Time. Real-world results are disclosed in addition to the theoretical evaluation. The real-world results are shown in Table 4, disclosed below.

TABLE 4

| A comparison of the storage size (KB) and inference time (ms) for real-world test. The results are generated on Set 5 with scale x2. | | | |
| --- | --- | --- | --- |
| Methods | PSNR (Set5) | Size | Inference Time |
| EDSR Baseline | 38.05 | 5366 KB | 460 ms |
| HEUN-L | 38.09 | 2858 KB | 240 ms |
| HEUN-M | 38.03 | 1902 KB | 176 ms |
| HEUN-S | 37.93 | 904 KB | 162 ms |

From Table 4, disclosed above, it can be observed that the speed of HEUN-S is not much faster as the theoretical calculation comparing with the HEUN-M. This may be caused by the better optimization of standard convolution on CUDA. It is understood that HEUN-S can perform faster in an environment specified for edge devices.

In summary and for non-limiting example, as disclosed above, a lightweight network referred to herein as Hybrid Element-Unshuffled Network (HEUN) may be employed for image SR. An example embodiment may include the Self-Residual Depth-wise Separable Convolution to overcome the defects of the depthwise convolution, and the element-unshuffled downsampling may be employed to enhance the performance with low-frequency representations. Both proposed modules take limited computation costs and parameters. With the two proposed modules, an example embodiment of a lightweight block, referred to herein as a Hybrid Element-Unshuffled Block, may be designed with a standard convolution layer and an Element-Unshuffled Block. Further, as disclosed above, an example embodiment of HEUN can achieve new SOTA performance with limited parameters and Multi-Adds. In addition, disclosure with regard to a discovery of a relationship between the PSNR and the NME among the shallow features and deep features is provided. It is understood that the phenomenon should be general, and can be taken advantage of for network design.

Figure 15:
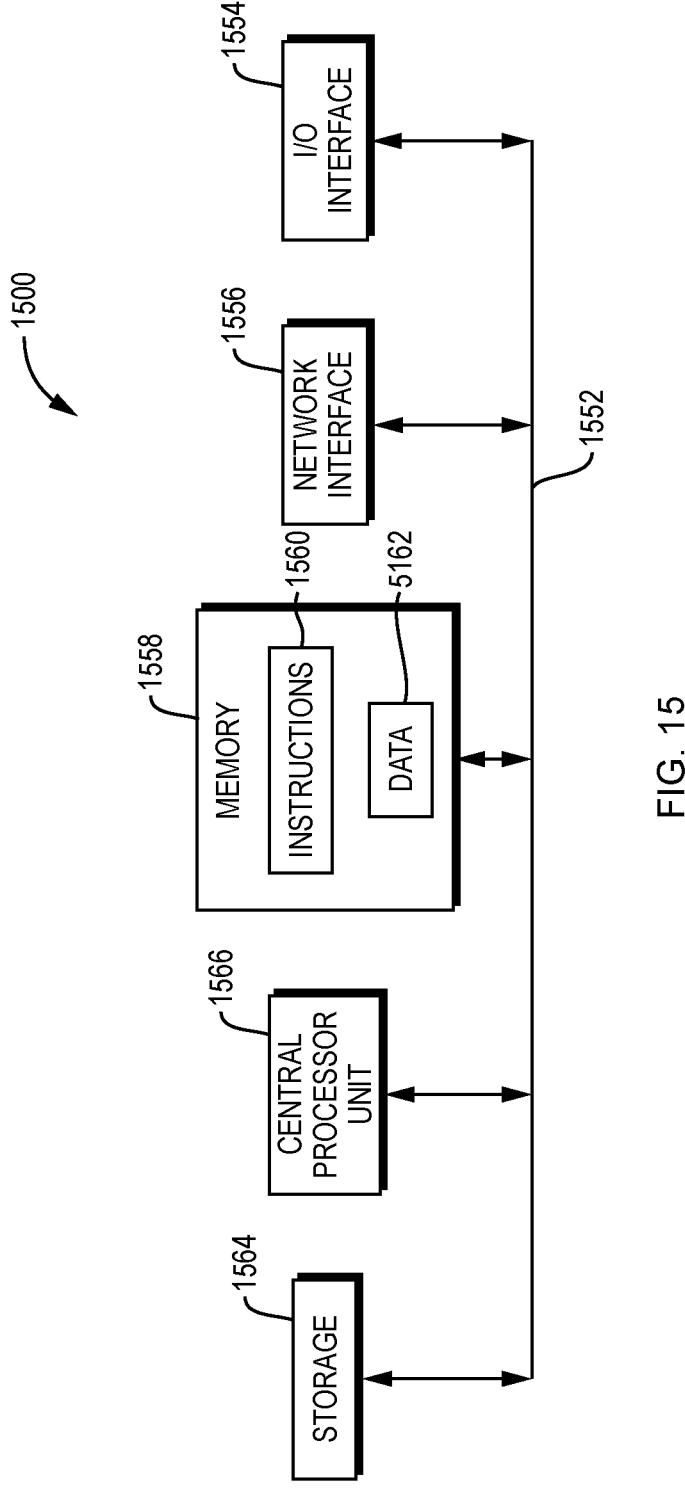
FIG. 15 is a block diagram of an example internal structure of a computer optionally within an embodiment disclosed herein.

FIG. 15 is a block diagram of an example of the internal structure of a computer 1500 in which various embodiments of the present disclosure may be implemented. The computer 1500 contains a system bus 1552, where a bus is a set of hardware lines used for data transfer among the components of a computer or digital processing system. The system bus 1552 is essentially a shared conduit that connects different elements of a computer system (e.g., processor, disk storage, memory, input/output ports, network ports, etc.) that enables the transfer of information between the elements. Coupled to the system bus 1552 is an I/O device interface 1554 for connecting various input and output devices (e.g., keyboard, mouse, displays, printers, speakers, etc.) to the computer 1500. A network interface 1556 allows the computer 1500 to connect to various other devices attached to a network (e.g., global computer network, wide area network, local area network, etc.). Memory 1558 provides volatile or non-volatile storage for computer software instructions 1560 and data 1562 that may be used to implement embodiments (e.g., method 300) of the present disclosure, where the volatile and non-volatile memories are examples of non-transitory media. Disk storage 1564 provides non-volatile storage for computer software instructions 1560 and data 1562 that may be used to implement embodiments (e.g., method 300) of the present disclosure. A central processor unit 1566 is also coupled to the system bus 1552 and provides for the execution of computer instructions.

As used herein, the term "module" may refer to any hardware, software, firmware, electronic control component, processing logic, and/or processor device, individually or in any combination, including without limitation: an application specific integrated circuit (ASIC), a field-programmable gate-array (FPGA), an electronic circuit, a processor and memory that executes one or more software or firmware programs, and/or other suitable components that provide the described functionality.

Example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete methods described herein. It should be understood that elements of the block and flow diagrams may be implemented in software or hardware, such as via one or more arrangements of circuitry of FIG. 15, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for performing image super-resolution (SR), the method comprising:

performing image SR on a low-resolution (LR) representation of a high-resolution (HR) original image, the HR original image at a higher resolution relative to a resolution of the LR representation, the image SR including:

performing element-unshuffled downsampling, the element-unshuffled downsampling including producing a plurality of sub-features from input features, the input features including elements from a transformed version of the LR representation;

performing a max-pooling operation on sub-features of the plurality of sub-features to produce a plurality of pooled sub-features;

convolving, using group convolution, pooled sub-features of the plurality of pooled sub-features, the convolving outputting features;

upsampling the features output from the convolving to produce up-sampled features;

producing enhanced features by adding the up-sampled features to the input features; and producing a reconstructed version of the HR original image; and outputting the reconstructed version produced.

2. The method of claim 1, wherein the element-unshuffled downsampling includes:

performing an element-unshuffle operation, the element-unshuffle operation including downsampling the input features, the downsampling including reducing a size of the input features by separating the input features into the plurality of sub-features.

3. The method of claim 2, wherein the separating includes selecting a subset of elements from an input feature of the input features and creating a sub-feature of the plurality of sub-features by grouping the subset of elements selected.

4. The method of claim 1, wherein the image SR further includes producing the reconstructed version based on the enhanced features produced.

5. The method of claim 1, wherein the element-unshuffled downsampling includes performing an element-unshuffle operation and wherein the element-unshuffle operation enables the element-unshuffled downsampling that yields higher performance relative to a performance based on downsampling via a different downsampling operation different from the element-unshuffled downsampling.

6. The method of claim 5, wherein the higher performance includes higher image quality.

7. The method of claim 1, wherein the image SR is performed in a non-recurrent, feed-forward manner.

8. A system for performing image super-resolution (SR), the system comprising:

an element-unshuffled downsampler; and an image SR module configured to perform image SR on a low-resolution (LR) representation of a high-resolution (HR) original image, the HR original image at a higher resolution relative to a resolution of the LR representation, the image SR module further configured to produce a reconstructed version of the HR original image via the image SR performed, the image SR based on element-unshuffled downsampling of the LR representation, the element-unshuffled downsampler configured to perform the element-unshuffled downsampling and to produce, via the element-unshuffled downsampling, a plurality of sub-features from input features, the input features including elements from a transformed version of the LR representation, the image SR module further configured to output the reconstructed version produced, wherein, to perform the image SR, the image SR module is further configured to:

perform a max-pooling operation on sub-features of the plurality of sub-features to produce a plurality of pooled sub-features;

convolve, using group convolution, pooled sub-features of the plurality of pooled sub-features, the convolving outputting features;

upsample the features output from the convolving to produce up-sampled features; and produce enhanced features by adding the up-sampled features to the input features.

9. The system of claim 8, wherein, to perform the element-unshuffled downsampling, the element-unshuffled downsampler is further configured to:

perform an element-unshuffle operation, the element-unshuffle operation including downsampling the input features, the downsampling including reducing a size of the input features by separating the input features into the plurality of sub-features.

10. The system of claim 9, wherein, to separate the input features into sub-features, the element-unshuffled downsampler is further configured to select a subset of elements from an input feature of the input features and create a sub-feature of the plurality of sub-features by grouping the subset of elements selected.

11. The system of claim 8, wherein the image SR module is further configured to produce the reconstructed version based on the enhanced features produced.

12. The system of claim 8, wherein, to perform the element-unshuffled downsampling, the element-unshuffled downsampler is further configured to perform an element-unshuffle operation and wherein the element-unshuffle operation enables the element-unshuffled downsampling that yields higher performance relative to a performance based on downsampling via a different downsampling operation different from the element-unshuffled downsampling.

13. The system of claim 12, wherein the higher performance includes higher image quality.

14. The system of claim 8, wherein the image SR module is further configured to perform the image SR in a non-recurrent, feed-forward manner.

15. The system of claim 8, wherein the image SR module is further configured to implement a neural network and employ the neural network to perform the image SR.

16. A non-transitory computer-readable medium for performing image super-resolution (SR), the non-transitory computer-readable medium having encoded thereon a sequence of instructions which, when loaded and executed by at least one processor, causes the at least one processor to:

perform image SR on a low-resolution (LR) representation of a high-resolution (HR) original image, the HR original image at a higher resolution relative to resolution of the LR representation, the image SR including:

performing element-unshuffled downsampling, the element-unshuffled downsampling including producing a plurality of sub-features from input features, the input features including elements from a transformed version of the LR representation;

performing a max-pooling operation on sub-features of the plurality of sub-features to produce a plurality of pooled sub-features;

convolving, using group convolution, pooled sub-features of the plurality of pooled sub-features, the convolving outputting features;

upsampling the features output from the convolving to produce up-sampled features;

producing enhanced features by adding the up-sampled features to the input features; and producing a reconstructed version of the HR original image; and output the reconstructed version produced.

* * * * *